(12) United States Patent
Webster

(10) Patent No.: US 10,365,370 B2
(45) Date of Patent: Jul. 30, 2019

(54) WEAR TOLERANT HYDRAULIC / PNEUMATIC PISTON POSITION SENSING USING OPTICAL SENSORS

(71) Applicant: Timothy Webster, Vancouver (CA)

(72) Inventor: Timothy Webster, Vancouver (CA)

( * ) Notice: Subject to any disclaimer, the term of this patent is extended or adjusted under 35 U.S.C. 154(b) by 12 days.

(21) Appl. No.: 15/641,179

(22) Filed: Jul. 3, 2017

(65) Prior Publication Data

US 2018/0120437 A1     May 3, 2018

Related U.S. Application Data

(60) Provisional application No. 62/414,806, filed on Oct. 31, 2016.

(51) Int. Cl.
| | |
|---|---|
| *G06K 9/00* | (2006.01) |
| *G01S 17/46* | (2006.01) |
| *G01B 11/14* | (2006.01) |
| *G01B 11/00* | (2006.01) |

(Continued)

(52) U.S. Cl.
CPC ............ *G01S 17/46* (2013.01); *G01B 11/002* (2013.01); *G01B 11/14* (2013.01); *G01D 5/30* (2013.01); *G01D 18/006* (2013.01); *G01D 18/008* (2013.01)

(58) Field of Classification Search
CPC ........... G01S 17/46; G01B 11/14; H04N 7/18; G06K 15/02
See application file for complete search history.

(56) References Cited

U.S. PATENT DOCUMENTS

| | | | |
|---|---|---|---|
| 8,493,633 B2* | 7/2013 | Hoover | H04N 1/00567 |
| | | | 358/474 |
| 2006/0056077 A1* | 3/2006 | Johnston | B60R 11/04 |
| | | | 359/811 |

(Continued)

*Primary Examiner* — Amir Alavi

(57) ABSTRACT

The present invention relates to using a self calibrating and recalibrating 230, 925 optical sensors piston rod displacement. Self calibration enables field calibration of uncalibrated 230, 925 optical sensors. During operation, recalibration enables detecting and correcting for wear and damage of the 200 piston rod and/or 230, 925 optical sensors. 210 Calibration positions on the surface of the 200 piston rod are imaged by 230 optical sensors using laser or darkfield lenses designed for optical computer mice. Natural surface patterns can be used in locations where 210 calibration positions are required, which reduces or eliminates the need for marked 210 calibration positions. Marked 210 calibration positions are spatially unique encoded sequences used to determine the piston rod absolute position. Storing only the significant features of 210 calibration positions saves significant memory. The reduced memory requirements of each 210 calibration position enables the use of closely spaced or continuous 210 calibration positions. Multiple 210 calibration position features and multiple 230, 925 optical sensors together collectively provide immunity to localized 208 surface damage. Proximity sensors, 925 time of flight sensors and 031 cumulative relative displacement are used to estimate the 200 piston rod absolute displacement and reduce the number of spatially unique 210 calibration positions needed to compare in order to determine the piston rod absolute displacement.

26 Claims, 20 Drawing Sheets

(51) Int. Cl.
*G01D 5/30* (2006.01)
*G01D 18/00* (2006.01)

(56) References Cited

U.S. PATENT DOCUMENTS

| | | | | |
|---|---|---|---|---|
| 2011/0007153 | A1* | 1/2011 | Webster | F15B 15/2876 |
| | | | | 348/135 |
| 2012/0019875 | A1* | 1/2012 | Hoover | H04N 1/00567 |
| | | | | 358/474 |
| 2014/0139851 | A1* | 5/2014 | Mizes | B41J 29/393 |
| | | | | 358/1.9 |
| 2015/0049346 | A1* | 2/2015 | Suriawidjaja | B05C 11/00 |
| | | | | 356/625 |
| 2015/0241562 | A1* | 8/2015 | Goldberg | G01S 17/42 |
| | | | | 356/3.11 |
| 2015/0319365 | A1* | 11/2015 | Lloyd | H04N 5/23258 |
| | | | | 348/208.11 |
| 2018/0120437 | A1* | 5/2018 | Webster | G01B 11/14 |

* cited by examiner

WEAR TOLERANT HYDRAULIC / PNEUMATIC PISTON POSITION SENSING USING OPTICAL SENSORS

BACKGROUND OF THE INVENTION—OBJECTS AND ADVANTAGES

This invention relates to self calibrating and recalibrating an optical sensor to measure piston rod displacement, thereby enabling initial field calibration and recalibration to correct for wear and damage, and proximity sensors, time of flight sensors, cumulative relative displacement are used to estimate the piston rod absolute displacement and reduce the number of spatially unique calibration positions needed to compare in order to determine the piston rod absolute displacement, thereby reducing memory storage and computational resources required, which enable closely spaced or continuous calibration positions, and the use of naturally occurring speckle patterns as calibration positions reduce the need to use marked encoded sequences as calibration positions.

DESCRIPTION OF PRIOR ART

Piston position sensors (for example, U.S. Pat. No. 9,027,460 B2) that measure the position by series electrical resonates are not easy to implement in practice. Oil conductivity is variable with respect to temperature and pressure. Furthermore, the oil conductivity vs temperature and pressure relationship needs to be re-characterized as the oil ages.

Optical motion sensors (for example, U.S. Pat. No. 8,525,777 B2, U.S. Pat. No. 9,086,738 B2. U.S. Pat. No. 9,342,164 B2, U.S. Pat. No. 7,737,947 B2, U.S. Pat. No. 8,692,880 B2) measures the relative movement of the surface, but are unable to determine the absolute position with respect to the surface.

Optical position sensors (for example, U.S. Pat. No. 8,482,607 B2) are able to determine the absolute position at calibration positions. They do not include an efficient means of storing calibration position images. As result, only a few calibration position images can be stored with the result that estimated absolute position error can grow significantly until corrected at calibration positions.

Optical position sensors (for example, EP patent no. EP2769104 B1) rely on an optically detected code pattern and utilizes light pipes. Etching or otherwise adding these optically detectable code patterns increase the manufacturing cost significantly.

Optical position sensors (for example, U.S. Pat. No. 9,134,116 B2) utilize multiple lasers and/or sensors to provide greater coverage of the curved piston surface than is possible with a single laser and sensor, but are unable to determine the absolute position with respect to the surface.

Optical position sensors (for example, EP patent no. EP2775268 A1) utilize coherent or nearly coherent light to gather speckle interference image for each position. The position between the stored speckle interference images is completely unknown. Without image compression and/or significant point identification, the memory size required to store a large enough number of points to be useful is impractically large.

Optical alignment sensors (for example, CN patent no CN2015/075823) align images utilizing image significant features. However, the images significant features and absolute position is not stored. As result, it is not possible to determine the absolute position.

Optical feature matching is used (for example, U.S. Pat. No. 9,449,238 B2) to improve image correlation in adverse conditions which impact the appearance of images. However the means of collecting images is not provided and is restricted to well defined regular images.

Optical surface movement sensors use light limited to short wavelength (for example, U.S. Pat. No. 8,847,888 B2) to decrease light surface penetration and increase light surface reflection. However reduced light penetration offers no advantage for metal piston rods most commonly used. A combination of narrow band red and blue light is more suitable for penetrating an oil film which may be present and reach the very optically dense metal.

Optical surface movement sensors (for example, U.S. Pat. No. 7,728,816 B2, U.S. Pat. No. 9,052,759 B2) adjust measurement resolution along X and Y axis according to the estimated velocity along the axis. However a means of collecting and storing images is not provided.

Hollow piston rods containing magnetic, microwave and optical sensors within are well established in the field. However it is not practical or cost effective to gun drill or forge long or small diameter piston rods. Optical and radio time of flight sensors require calibration and re-calibration when the optical characteristics change. And low cost external time of flight sensors are vulnerable to objects obscuring the optical path. As a result, optical time of flight sensor used alone to determine the absolute piston rod displacement suffer from low reliability.

SUMMARY OF THE INVENTION

The present invention is using a self calibrating and recalibrating optical sensor to measure piston rod displacement. Self calibration enables field calibration of an uncalibrated optical sensor. During operation, recalibration enables detecting and correcting for wear and damage of the piston rod and/or optical sensors. Natural speckle patterns can be used in locations where calibration positions are required, which reduces or eliminates the need for marked calibration positions. Marked calibration positions are spatially unique encoded sequences used to determine the piston rod absolute position. Storing only the significant features of calibration positions saves significant memory. The reduced memory requirements of each calibration position enables closely spaced or continuous calibration positions. Multiple calibration position features and multiple optical sensors together collectively provide immunity to localized damage. Proximity sensors, time of flight sensors and cumulative relative displacement are used to estimate the piston rod absolute displacement and reduce the number of spatially unique calibration positions needed to compare in order to determine the piston rod absolute displacement.

The optical sensors used to determine the absolute displacement of a hydraulic or pneumatic piston rod relative to its cylinder are calibrated at calibration positions and the absolute displacement is estimated by means of the cumulative of measured relative displacement from said absolute displacement. The steps to estimate the absolute displacement are as follows: Capture images of the piston surface by a CMOS or CCD image sensor using low cost laser or darkfield lens designed for optical computer mice. Arrangements of points that contrast with adjacent surroundings are selected from the captured images. These selected arrangements of significant points are mapped to their corresponding absolute piston rod positions and stored as calibration positions. These significant points which identify a calibration absolute piston rod position is an arrangement of known calibration points. The selected arrangement of points from the current image is aligned with the arrangement of known calibration points of a calibration position.

DRAWINGS—FIGURES

The advantages of this invention may be better understood by reading the following description as well as the accompanying drawings, where numerals indicates the structural elements and features in various figures. The drawings are not necessarily to scale, and they demonstrate the principles of the invention.

DRAWINGS—REFERENCE NUMERALS

Figure 1:
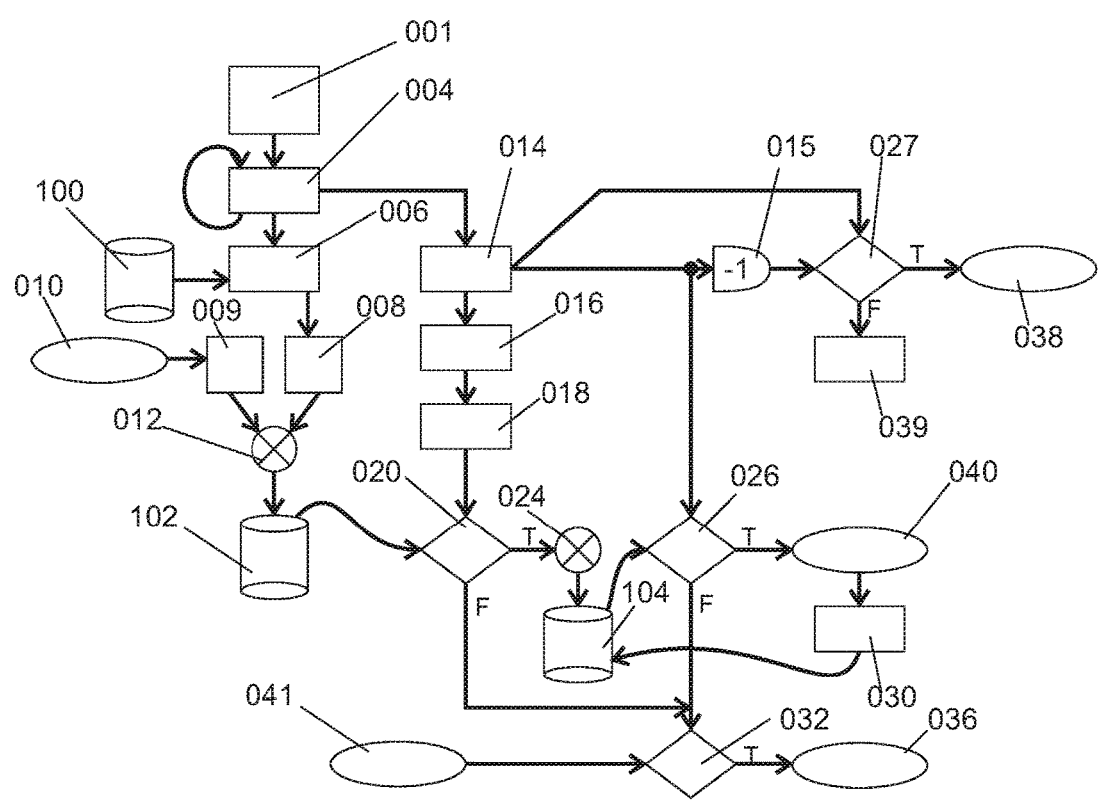
FIG. 1 is a flow diagram of the position identification sensing apparatus during operation.
Figure 5:
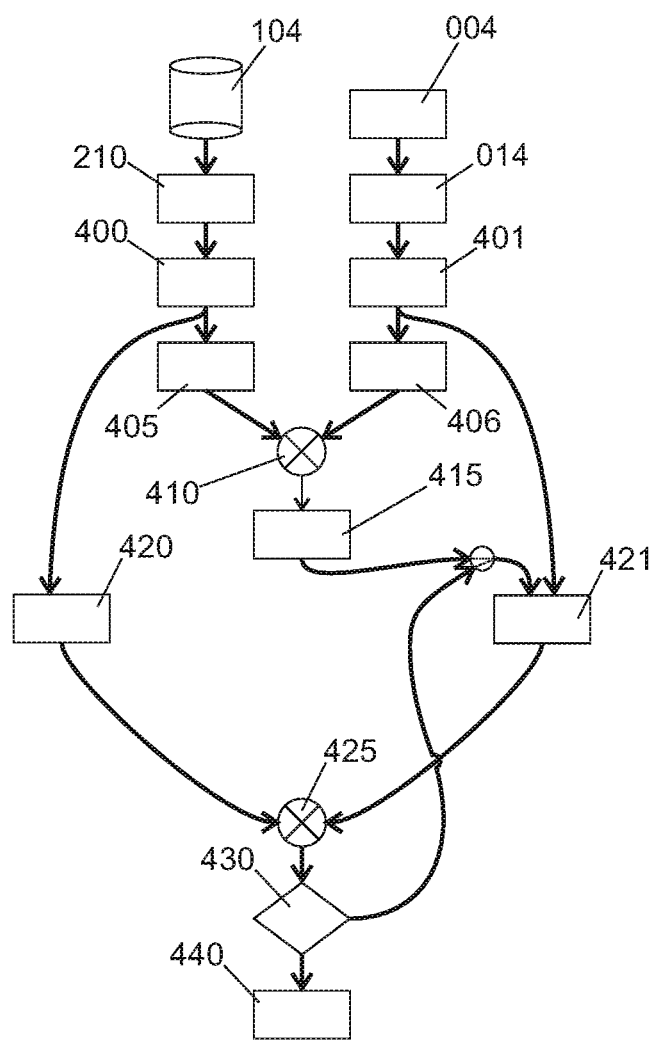
FIG. 5 is a flow diagram of speckle feature pattern 026/027 correlation with current image significant features 014 during calibration operation using FFT-CC and IC-GN.

001 speckle image
004 image uniform scale correction
005 hold until update
006 convolve with Gabor wavelets
008 Gabor group selector
009 position group selector
010 estimated absolute position for group selection
012 SURF/SIFT descriptor selector
014 current speckle image significant features which may also be known as points of interest
015 delay until next image capture
016 finding scale space
018 feature descriptor
020 candidate matching SIFT/SURF feature descriptor
024 speckle pattern selector
026 speckle feature pattern correlated displacement between 210 calibration position significant features and current image significant features 014
027 speckle feature pattern correlation between previous image significant features 014 and current image significant features 014
030 increment successful match count
031 cumulative relative speckle displacement from most recent known position
032 test condition, is absolute position known
033 estimated absolute position
034 new SURF/SIFT descriptor for the known location, new speckle significant points
036 calibration storage procedure
038 relative speckle displacement
039 unsuccessful relative displacement count
040 calculated relative speckle 210 calibration position
041 absolute position from a 918, 919 piston stroke limit sensor, or from one or more sub-component of a compound position identification sensing apparatus, or relative position to a part or complete 210 calibration speckle feature with the 209 full speckle view
042 absolute position from the position sensing algorithm described in FIG. 1
100 database of Gabor wavelets for grouping SURF/SIFT feature descriptors
102 database of SURF/SIFT feature descriptors grouped by Gabor wavelet and by position
104 database of 210 calibration significant point speckle patterns indexed by SURF/SIFT feature descriptor
105 calibration data for 925 time of flight sensors
110 red laser surface speckle area
112 blue laser surface speckle area
114 green laser surface speckle area
116 darkfield 208 surface area
120 red laser
121 red LED
122 blue laser
124 green laser
130 optional source lenses 135 collector lenses
200 cylindrical or flat part under observation such as a piston rod
202 CMOS or CCD image sensor
208 surface of 200 part under observation
209 full speckle view
210 calibration speckle image position of speckle feature area described by Gabor wavelets, SURF/SIFT feature descriptors and corresponding significant point speckle pattern
212 pixels are periodically connected to form 001 speckle image groupings
215 spaced binary sequence 1D calibration pattern
216 spaced binary sequence 2D calibration pattern
230 optical displacement sensor assembly
231 microprocessor, FPGA and/or ASIC
233 non-volatile memory
234 volatile memory
242 calibration speckle image features caused by wear
300 flat part reference plain
400 mean normalized calibration speckle image
401 mean normalized current speckle image
405 Fourier transform of mean normalized calibration speckle image
406 Fourier transform of mean normalized current speckle image
410 Inverse Fourier transform of Fourier transform product
415 FFT-CC x and y displacement at the maximum 410 Inverse Fourier transform of the Fourier transform 405× 406 product, which is a low resolution 026 speckle feature pattern correlated displacement between 210 calibration position significant features and current image significant features 014
420 warped arrangement of known calibration points
421 warped current image significant pattern features with delta deformation displacement
425 least squares calculation of delta deformation displacement
430 delta deformation displacement convergence conditions
440 IC-GN sub-pixel delta displacement, which is a high resolution 026 speckle feature pattern correlated displacement between 210 calibration position significant features and current image significant features 014
800 start state
804 initialization, self check and communication state
820 complete calibration image, including compound calibration image
825 not surrounded by sufficient 210 calibration points or at end limits
832 operation state described in FIG. 1, FIG. 2, and FIG. 3
836 simultaneous calculation of precise location described in FIG. 5
901 hydraulic cylinder barrel
902 piston
903 time of flight piston reflector also known as optical distance reflector
904 base stop
905 head stop
906 seal in cylinder
907 hydraulic cylinder head chamber
908 hydraulic cylinder base chamber
910 sensing apparatus housing
912 seals for sensing apparatus
918 base contact pressure sensor, stroke limit sensor
919 head contact pressure sensor, stroke limit sensor
925 time of flight sensor also known as optical distance sensors
930 sensor pcb board

DETAILED DESCRIPTION

In the following, the described speckle images are either true speckle images caused by coherent laser light interface or facsimile speckle images caused by darkfield surface diffraction. Both speckle images may be additively constructed by overlapping spatial areas as shown in FIG. 9, FIG. 10, FIG. 11, FIG. 12 and FIG. 13.

Figure 7:
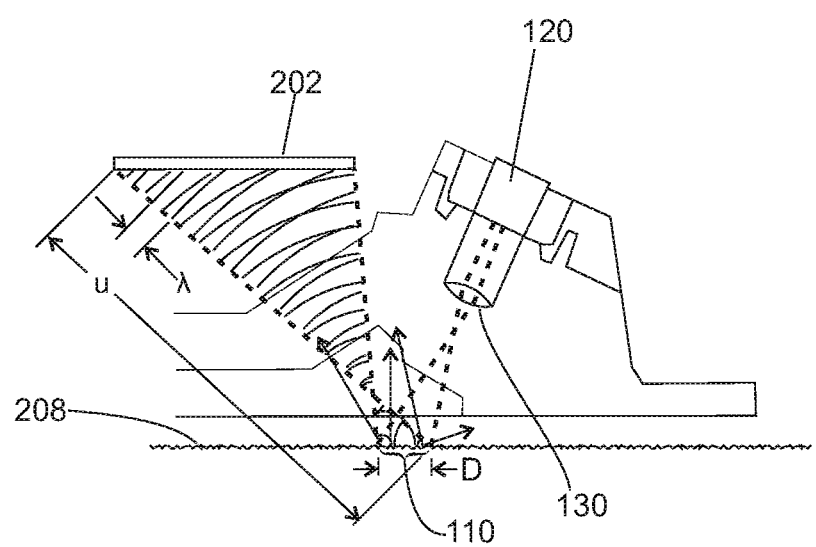
FIG. 7 is a side view diagram of a single laser position identification sensing apparatus.

FIG. 7 is a side view diagram of a single laser position identification sensing apparatus. The coherent light of the 120, 122 or 124 laser passes through a 130 optional source lens illuminating an 110, 112 or 114 speckle area on the 208 surface of the 200 part under observation. The 130 optional source lens refract/bend the narrow laser beam to illuminate a larger area 208 surface of the 200 part under observation. According to Huygens-Fresnel principle, every refracting surface point can be regarded as source for a new wavelet. The wavelets propagate freely without a lens toward the observation plane where they interfere, which result in locally distributed occurrences of constructive and destructive interference. Speckles can be observed from metallic surfaces and show high contrast which makes artificial markers typically unnecessary. The average in-plane speckle d size observed by the 202 CMOS or CCD image sensor is given by $$d = 1.2 \frac{\lambda u}{D},$$

where λ is the light wavelength, u is the distance between the 202 CMOS or CCD image sensor and the 208 surface of the 200 part under observation, D is the diameter of illumination on the 208 surface of the 200 part under observation. A 004 image uniform scaling correction step can be used to compensate for the significant difference in u distance across the 202 CMOS or CCD image sensor, between the 202 CMOS or CCD image sensor and the 208 surface of the 200 part under observation.

FIG. 1 refers to the control logic of the position identification sensing apparatus. The data flow and processing steps illustrated in FIG. 1 are as follows. The 001 speckle image is captured by a 202 CMOS or CCD image sensor of single or compound pattern image sensing apparatus. 004 Image uniform scale correction can be applied to correct non-uniform average speckle d size caused by the curved 200 piston rod 208 surface. In the case of a laser pattern image sensor, the non-uniform average speckle size d is caused by varying u distance between the 202 CMOS or CCD image sensor and the 208 surface of the 200 part under observation. The uniform scaled 001 speckle image processed by the 004 image uniform scale correction is 006 convolved with Gabor wavelets retrieved from the 100 database of Gabor wavelets. The 010 estimated absolute position is used to provide 009 position group selection of the SURF/SIFT feature descriptors. The 008 Gabor group selector is used in combination with the 009 position group selector as input to 012 SURF/SIFT descriptor selector. The 012 SURF/SIFT descriptor selector selects ranking groups of candidate matching SIFT/SURF feature descriptors. The result is a reduced number of 020 candidate SURF/SIFT feature descriptors from the 102 database of SIFT/SURF feature descriptors, grouped by Gabor wavelet and by position, that need to be considered.

Databases of 100 Gabor wavelets, 102 SURF/SIFT feature descriptors, and 104 significant point speckle patterns are stored in 233 read/writable non-volatile memory. The control logic is executed on a 231 microprocessor, FPGA and/or ASIC, with temporary execution results preferable stored in 234 volatile memory. Error correcting encoding and redundancy can be used to provide for reliable long term storage and error free control logic execution and data processing.

Continuing the data flow and processing steps illustrated in FIG. 1, the SIFT/SURF algorithm is applied as follows. 014 Significant features of the uniform scaled 001 speckle image are selected in parallel with 006 convolving the speckle image with Gabor wavelets. The SURF algorithm uses a blob detector based on the Hessian matrix to find the points of interest. The next step is to find the 016 scale space from the previously selected significant points. The resulting 018 feature descriptor is matched against 020 candidate matching SIFT/SURF feature descriptors retrieved from the 102 database. If a match occurs, the 024 speckle pattern selector retrieves a 210 calibration image speckle pattern of significant features from the 104 database of significant point speckle pattern features indexed by SURF/SIFT feature descriptors. The end result is the significant features of the current 001 speckle image being 026 correlated with the 210 calibration image speckle feature patterns retrieved from the 104 database.

The data flow and processing steps of the apparatus illustrated in FIG. 1 continue with the 014 speckle image significant feature correlation. The 014 significant features of the current 001 speckle image and the 014 significant features of the previous 001 speckle image are 027 correlated to find the 038 relative speckle displacement. The 014 significant features of the previous 001 are the 014 significant features of the current 001 speckle image 015 delayed until the next image capture. The current and previous 001 speckle images are designed to overlap and will be correlated during normal operation. When the current 001 speckle image and the previous 001 speckle image are found to be not correlated by the 027 correlation operation, the apparatus increments the 039 unsuccessful relative displacement count. High 039 unsuccessful relative displacement count indicates that either 202 CMOS or CCD image sensor is unable to reliably resolve the 208 surface image. Or the current and previous 001 speckle images do not overlap which is perhaps caused by the 200 part under observation moving at an extremely high speed.

Figure 4:
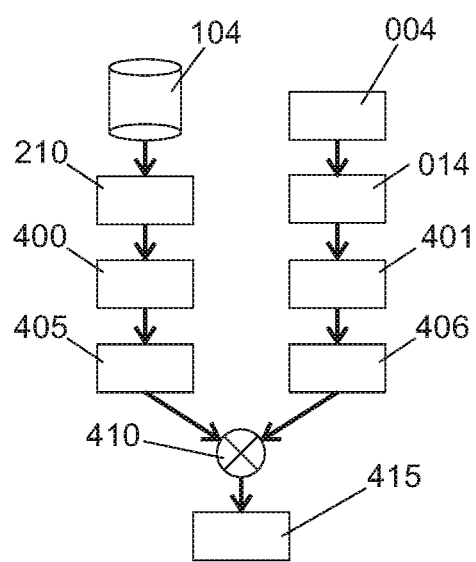
FIG. 4 is a flow diagram of speckle feature pattern 026/027 correlation with current image significant features 014 during normal operation using FFT-CC.
Figure 18:
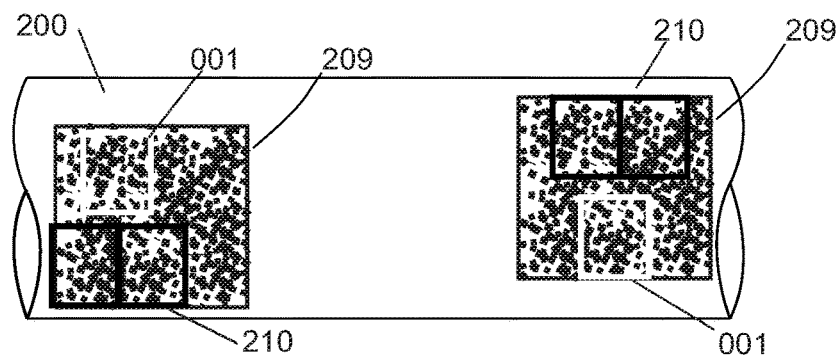
FIG. 18 illustrates the speckle correlation algorithm.

The data flow and processing steps illustrated in FIG. 1 describing detection of calibration positions are as follows. The previously selected 210 calibration position's arrangement of significant speckle points are correlated with current image significant points to find the absolute position of the 200 part under observation with respect to the matching 210 calibration position. The components of 210 calibration positions are stored in calibration point databases 100, 102, 104. The 026 speckle feature pattern correlation between 210 calibration position significant features and current image significant features 014 is determined as follows. Please see FIG. 4 for the details of the correlation process. The 210 calibration image speckle feature pattern is correlated with the uniform scaled 001 speckle image using the fast less precise FFT-CC "Fast Fourier Transform Cross Correlation", shown in FIG. 4. The 210 calibration speckle image at the calibration position is normalized to create a 400 mean normalized calibration speckle image. Then create the 405 Fourier transform of the mean normalized calibration speckle image. The 014 current speckle image significant features are normalized to create a 401 mean normalized current speckle image. Then create the 406 Fourier transform of the mean normalized current speckle image. Combine 405 and 406 Fourier transforms to create the 410 Inverse Fourier transform of the Fourier transform 405×406 product. As shown in FIG. 18, the 415 x, y displacement of the 001 speckle image from the 210 calibration image speckle position within the same 209 full speckle view is found at the maximum 410 Inverse Fourier transform of the Fourier transform 405×406 product.

The data flow and processing steps illustrated in FIG. 1 are further described below. When there is 026 speckle feature pattern correlation between the 210 calibration position significant features and the 014 current image significant features, the correlation is used to obtain the 040 calculated relative speckle 210 calibration position within the 209 full speckle view. When the FFT-CC algorithm is used to obtain the 040 calculated relative position within the 209 full speckle view, it provides the 415 x, y displacement of the 001 speckle image from the 210 calibration speckle image position. If the IC-GN algorithm illustrated in FIG. 5 is used to obtain the 040 calculated relative position within the 209 full speckle view, it provides the high accuracy 440 IC-GN sub-pixel delta displacement of the 001 speckle image from the 210 calibration speckle image position. And as a result the 210 calibration speckle image position on the 208 surface of the 200 part under observation is known relative to the 202 CMOS or CCD image sensor. Whenever a successful correlation match occurs, the 030 successful match count of the 210 calibration speckle image is incremented.

The data flow and processing steps illustrated in FIG. 1 which occur when 210 calibration image speckle positions cannot be matched is as follows. When the highest ranking 020 candidate matching SIFT/SURF feature descriptor fails to be a close match, then another 020 candidate matching SIFT/SURF feature descriptors in the group of SURF/SIFT feature descriptors from 102 database selected by 008 Gabor group and the 009 position group are considered according to their ranking. Similarly, if the 210 calibration position speckle feature pattern corresponding to the candidate SIFT/SURF feature descriptor is not sufficiently close to the 001 speckle image, another candidate SIFT/SURF feature descriptor is selected by 008 Gabor group and the 009 position group. If no more candidates exist, then no match was found. If the 210 calibration speckle image is sufficiently close to the 001 speckle image, then the 040 relative position of the 210 calibration speckle image within the 209 full speckle view is calculated.

Figure 10:
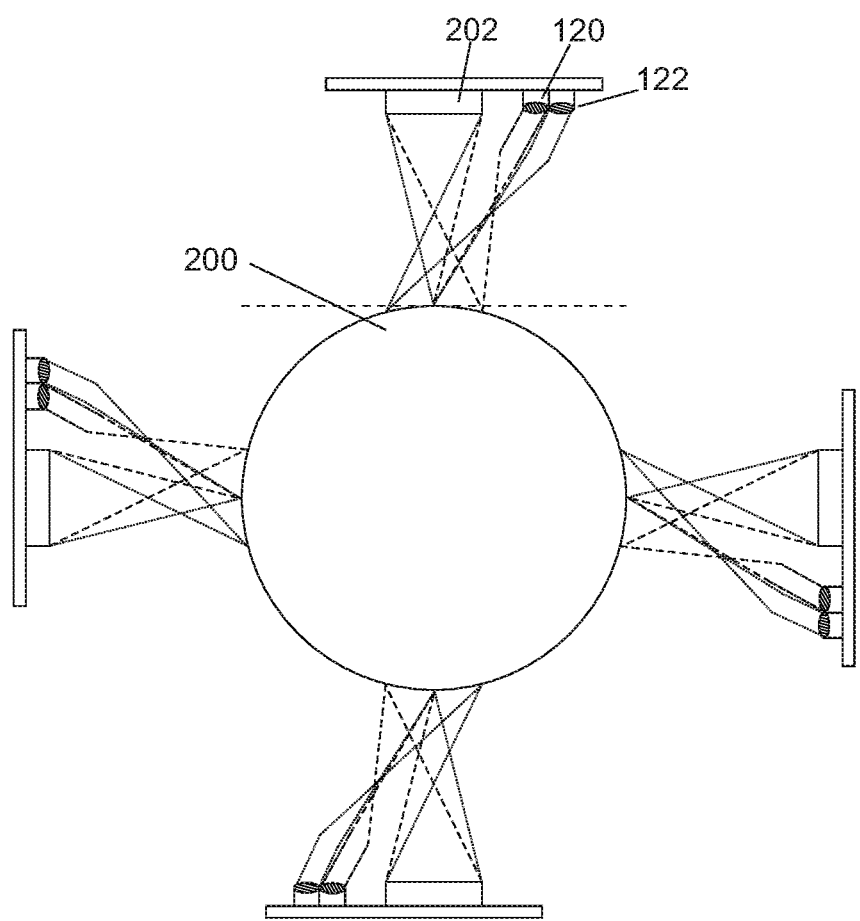
FIG. 10 is a diagram illustrating the end view of multiple compound speckle pattern image sensing apparatus.

The data flow and processing steps illustrated in FIG. 1 and FIG. 2 describing the calibration position update procedure are as follows. The full procedure to update calibration positions is shown in FIG. 1, 2, 6. This procedure initiates when no candidate matching SIFT/SURF feature descriptor is found for the current 001 speckle image within the 209 full speckle view or when no 210 calibration speckle feature is found for the 001 speckle image with the 209 full speckle view. The 041 absolute position can be known by either from one or more position identification sensing apparatus of a compound position identification sensing apparatus such as shown in FIG. 10, or the 041 absolute position is provided by a limit sensor or by the relative position to a part or complete 210 calibration speckle features within the 209 full speckle view. If the 041 absolute position is known, then the Gabor wavelets, SURF/SIFT feature descriptors and speckle features of a 001 speckle image from within the 209 full speckle view can be stored into databases 100, 102 and 104. FIG. 3 is the processing step contained in the 036 calibration storage procedure. In the following description of the 036 calibration storage procedure, reference is made to components tied to, but not contained within the 036 calibration storage procedure. As shown in FIG. 3, if there are 825 not sufficient surrounding 210 calibration speckle image positions or the 200 piston rod is at a displacement end limit, then the 041 absolute position from a limit sensor or from one or more sub-component of a compound position sensor will be used. When a 210 calibration position is required at a location not known from the 041 absolute position from a limit sensor or from one or more sub-component of a compound position sensor, then 836 precise displacement from a previous 041 absolute position is determined using IC-GN algorithm described in FIG. 5. When the 230 optical displacement sensor is at a 041 absolute position, then the 032 test at a known absolute position is true and the absolute displacement can be used to obtain the 014 current speckle image significant features and for 105 calibration data for 925 time of flight sensors. When the 032 test condition indicates a known absolute position, new 210 calibration position data is stored using the 036 calibration storage procedure illustrated in FIG. 3.

If the distance to surrounding calibration positions is too far, one or more 210 calibration speckle images should be selected from within the 209 full speckle view and stored. The maximum distance between calibration positions is determined by the maximum accumulated position error. The accumulated position error is the error between the 033 estimated absolute position and the 041 true absolute position. The 033 estimated absolute position is calculated by adding the cumulative relative displacement to the 041 true absolute position of the last reliable 210 calibration speckle image. The selected 210 calibration speckle image is indexed by Gabor wavelets and relative position to surround 210 calibration speckle images. The corresponding SURF/SIFT feature descriptor of the 210 calibration speckle image is stored into 102 database of SURF/SIFT feature descriptors. And the significant point patterns of the 210 calibration speckle image is indexed by its SURF/SIFT feature descriptor and stored into 104 database of significant point speckle patterns.

210 Calibration speckle feature patterns with high successful match counts are 210 calibration speckle images with stable significant speckle pattern features. When 210 calibration speckle feature patterns change as result of surface wear or sudden surface damage, the 030 increment successful match count no longer increases. Calibration position speckle pattern features which no longer 030 increment their successful match count and are sufficiently close to other calibration position speckle pattern features may be replaced when 233 non-volatile memory is needed to store new 210 calibration speckle feature positions. Calibration maybe required when a sufficient number of calibration position speckle pattern features no longer 030 increment their successful match count and are not sufficiently close to other 210 calibration speckle feature positions.

Figure 2:
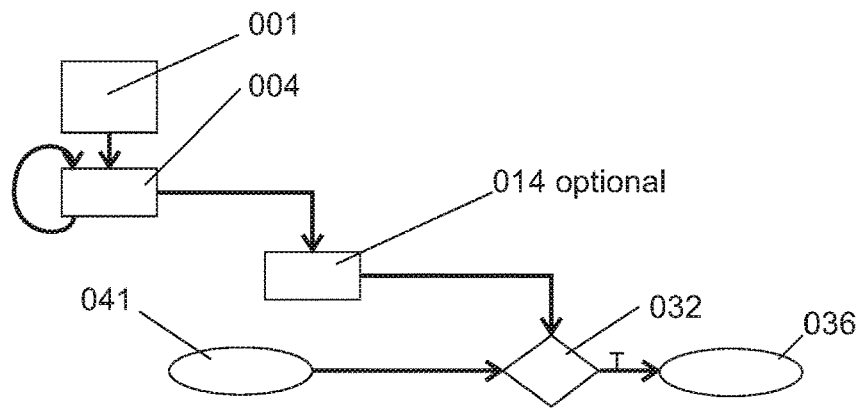
FIG. 2 is a flow diagram of the position identification sensing apparatus during calibration initialization.
Figure 3:
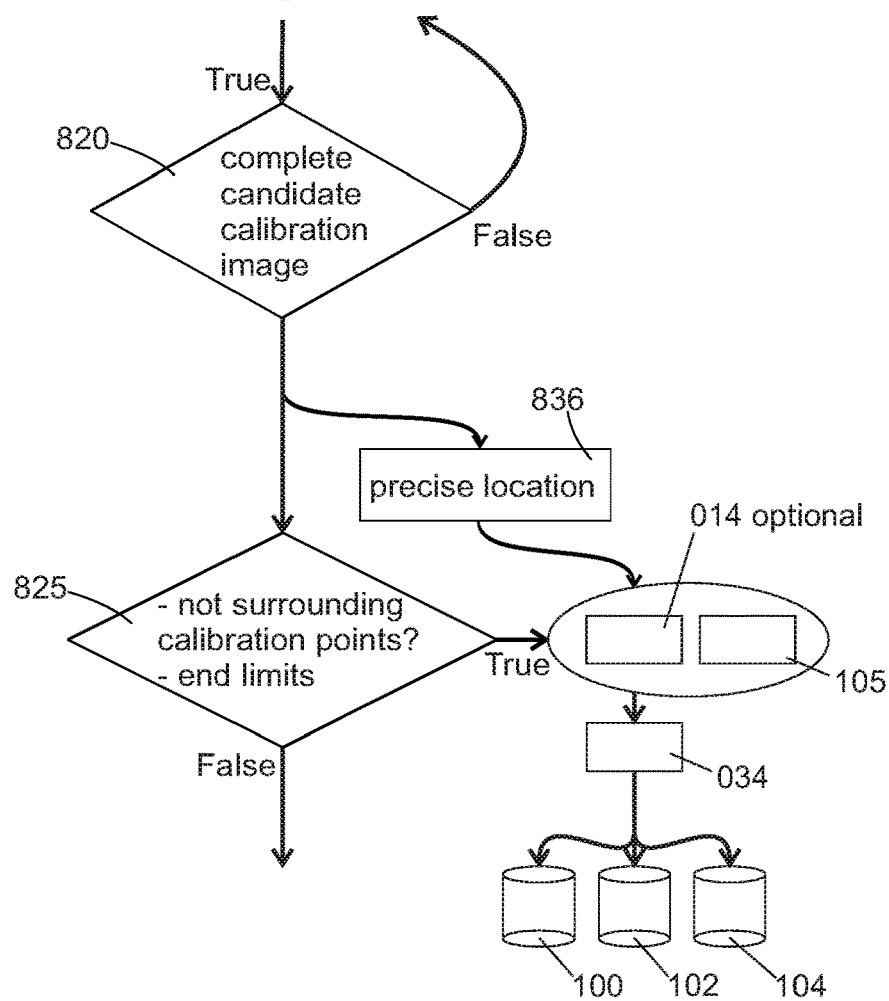
FIG. 3 is a flow diagram of calibration storage procedure 036 and 100, 102, 104 calibration database storage.
Figure 6:
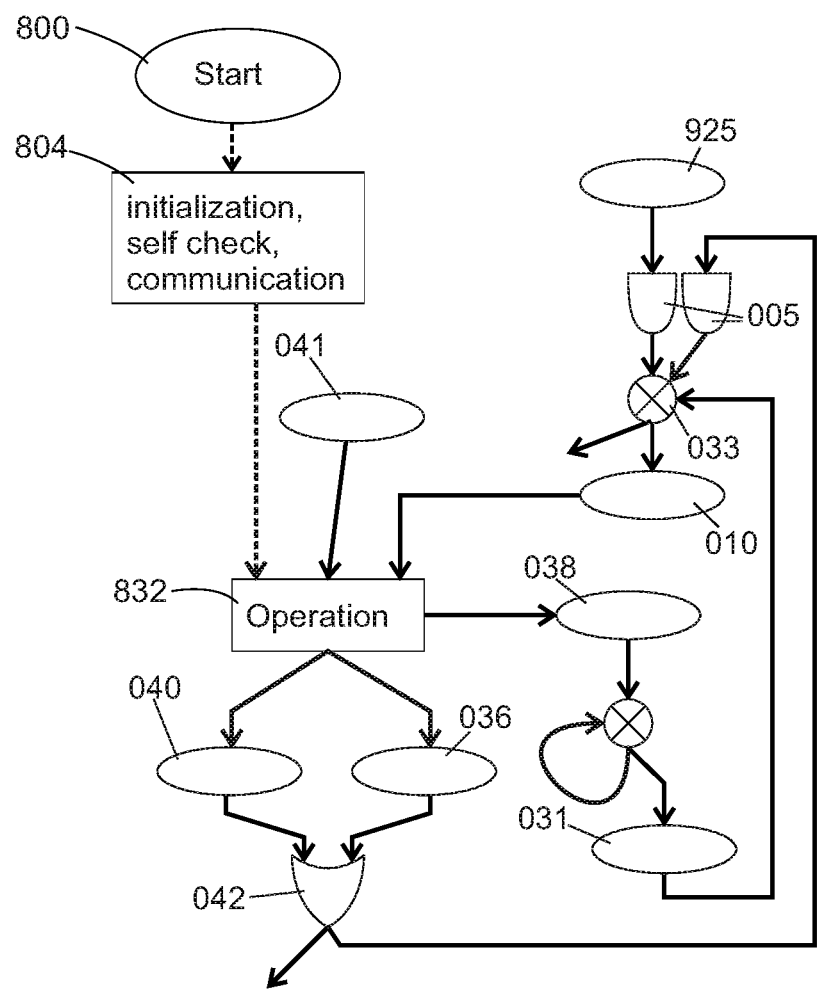
FIG. 6 is a flow diagram of the overall operation.

FIG. 2 refers to the calibration initialization control logic of the position identification sensing apparatus. The 001 speckle image is captured by a 202 CMOS or CCD image sensor of single or compound pattern image sensing apparatus. An 004 image uniform scale correction can be applied to correct non-uniform average speckle d size. Initially there are no stored 210 calibration speckle image positions and the calibration point databases 100, 102, 104 are empty. The first step in storing new 210 calibration positions is selecting 014 significant features from the uniform scaled 001 speckle image. The 041 absolute position can be provided by a 918, 919 piston stroke limit sensor shown in FIG. 23, or from one or more sub-component of a compound position identification sensing apparatus, or relative position to a part or complete 210 calibration speckle feature with the 209 full speckle view. During the initial calibration process, the 041 absolute position is only made available by a 918, 919 piston stroke limit sensor. If the 032 test condition is false, then the absolute position is unknown. And the location is again examined as shown in FIG. 6, until a 041 absolute position such as a 918, 919 piston stroke limit is provided which enables the 032 test condition to be true and the absolute position is known. When the lack of surrounding stored 210 calibration speckle feature positions is detected, it is necessary to assign new stored 210 calibration speckle feature positions. It is important to accurately assign the position of the new 210 calibration speckle features. During calibration, 027 speckle feature pattern correlation between previous image significant features 014 and current image significant features 014 is measured using the 440 IC-GN Inverse Composition Gauss-Newton sub-pixel delta displacement calculation, which is extremely precise, typically ranging from 0.01 to 0.05 pixel. This is 20 to 200 times more precise than the high speed 415 FFT-CC Fast Fourier Transform Cross Correlation used during normal mode to calculate 415 x and y displacement, which typically ranges from 1 to 2 pixels. When the position identification sensing apparatus is searching for new calibration positions, the position identification sensing apparatus is in calibration mode. As the 202 CMOS or CCD image sensor moves over the 200 cylindrical or flat part under observation, windows of 209 full speckle views are periodically captured. In calibration mode, the movement speed of the 202 CMOS or CCD image sensor moves over the 200 cylindrical or flat part is slowed so that the windows of 209 full speckle views are always over lapping by at least one 210 calibration speckle image position. The IC-GN algorithm also takes many times longer than the FFT-CC algorithm. The movement speed during calibration must be reduced to allow for this longer position processing time.

Figure 16:
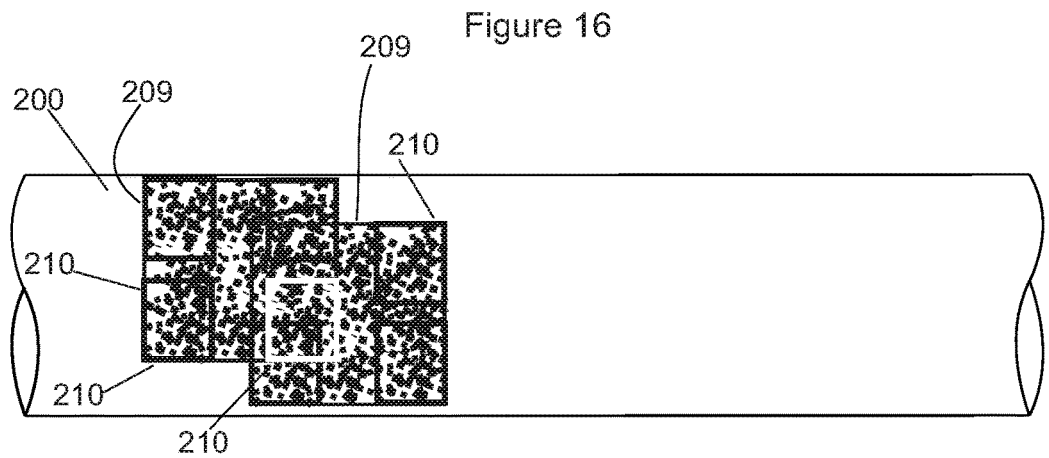
FIG. 16 illustrates constructing a continuous map of calibration position on the 208 surface of the 200 part under observation.

FIG. 16 illustrates a calibration mode 209 full speckle view window step. The initial step is the upper left of the 209 full speckle view. During the initial window step, four 210 calibration speckle image positions are selected from the four corners of the 209 full speckle view. If a 210 calibration speckle image position is completely enclosed within the overlapping 209 full speckle views, such as the upper left of the second 209 full speckle view window step, it does not need to be saved. The displacement between 209 full speckle views is precisely measured using the 440 IC-GN "Inverse Composition Gauss-Newton".

The 210 calibration image speckle feature pattern is correlated with the 001 speckle image using the slower precise IC-GN "Inverse Composition Gauss-Newton", shown in FIG. 5. In FIG. 5, similar to FIG. 4, the 210 calibration speckle image at the calibration position is normalized to create a 400 mean normalized calibration speckle image. The 014 current speckle image significant features are normalized to create a 401 mean normalized current speckle image. The next step is to create the 405 Fourier transform of the mean normalized calibration speckle image. Simultaneously the next step is to create the 406 Fourier Transform of the mean normalized current 001 speckle image. Combine 405 and 406 Fourier transforms to create the 410 Inverse Fourier Transform of the Fourier transform 405×406 product. As shown in FIG. 18, the 415 x, y displacement of the 001 speckle image from the 210 calibration speckle image position is within the same 209 full speckle view. In FIG. 5, the 415 FFT-CC x & y displacement is found at the maximum 410 Inverse Fourier Transform of the Fourier transform 405×406 product. The calculated 415 FFT-CC x & y displacement is the initial guess x & y displacement used in the 440 IC-GN algorithm. The 421 warped current image is calculated as a function of the 401 mean normalized current speckle image and the current deformation. The 420 warped arrangement of known calibration points is calculated as function of the 400 mean normalized calibration speckle image. A 425 least squares calculation of delta deformation displacement is calculated on the combined 400 warped arrangement of known calibration points and 401 mean normalized current speckle image. When the 425 least squares calculation of delta deformation displacement meets the 430 delta deformation displacement conditions, the current 425 least squares calculation of delta deformation is the final 440 IC-GN sub-pixel delta displacement. Otherwise, the current 425 least squares calculation of delta deformation displacement is used to calculate the next 421 warped current image.

Figure 17:
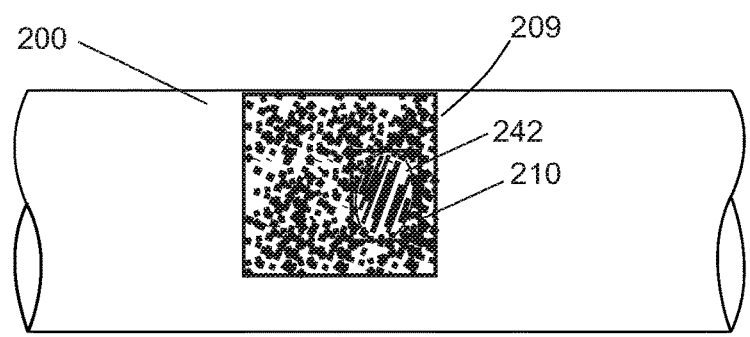
FIG. 17 illustrates re-selection of calibration position on the 208 surface of the 200 part under observation.

FIG. 17 illustrates the bottom right 210 calibration speckle image position from the previous 209 full speckle view deleted and replaced by a 210 calibration speckle image position with a high density of significant features. When the density of significant features is high as shown in FIG. 17, a single 210 calibration speckle image is sufficient to uniquely define a calibration position on the 208 surface of 200 part under observation. When the density of significant features is low as shown in FIG. 18, two or more abutting 210 calibration speckle images are used to uniquely define a calibration position on the 208 surface of 200 part under observation. As the calibration progresses, either a single 210 calibration speckle image sufficient to uniquely define a calibration position or two or more abutting 210 calibration speckle images sufficient uniquely define a calibration position are saved for each successive 209 full speckle view window step. In calibration mode, it is not necessary to systematically sweep over the 200 cylindrical or flat part under observation. The 210 calibration speckle image in each 209 full speckle view window step is retained until there are sufficient 210 calibration speckle image positions in all directions for the 200 cylindrical or flat part under observation. These retained 210 calibration speckle image positions are used as 041 reference absolute positions to measure displacement to 210 calibration speckle image positions along alternate paths. When 210 calibration speckle image positions are surrounded by sufficient 210 calibration speckle image positions in all directions, a single 210 calibration image speckle is sufficient to provide locally unique identification of the calibration position. Also 210 calibration position with higher density of significant features are retained and the previously required abutting 210 calibration speckle images are deleted.

FIG. 6 is a flow diagram describing the overall operation of the position identification sensing apparatus. On power up or reset the position identification sensing apparatus, enters the 800 start state. In 800 start state, the boot code is launched, which may include microcode, firmware and software. From the 800 start state, the position identification sensing apparatus enters the 804 initialization, self check and communication state. In the 804 state, the position identification sensing apparatus prepares to begin its function of identifying the position of 200 cylindrical or flat part under observation with respect to 202 CMOS or CCD image sensor.

The 042 absolute position from the position sensing algorithm and 033 estimate absolute position are the provided outputs used to determine the absolute position. The initial 033 estimated absolute position is obtained from 041 known absolute position from a 918, 919 piston limit extension/retraction sensor or from a calibrated 925 time of flight sensor. If the 925 time of flight sensor is uncalibrated, it can be calibrated using 041 known absolute positions as shown in FIG. 3. The operation procedure described in FIG. 1 is performed on each frame captured 001 speckle image. The 010 estimated absolute position used for group selection greatly reduces the possible 210 calibration position known significant feature sets to be matched against the 014 current speckle image significant feature. Operation during calibration mode depends on 041 known absolute positions from a 918, 919 piston extension/retraction limit sensor or a calibrated 925 time of flight sensor for the 036 calibration storage procedure of new 210 calibration positions. When operating in normal mode, the 042 absolute position is determined by either the 040 calculated relative speckle 210 calibration positions or by the position calculated from the 036 calibration storage procedure. The 042 absolute position calculated from 036 calibration storage procedure is preferentially selected to be the most reliable. The most recent 042 absolute position and the 925 time of flight estimated position are 005 held in volatile memory until updated with newer values. The 033 estimated absolute position is calculated by the combined most recent known position 005 held in volatile memory and the 031 cumulative relative speckle displacement. The 031 cumulative relative speckle displacement is the accumulated 038 relative speckle displacement. An external source of 031 relative speckle displacement can improve and/or verify the net 038 relative speckle displacement estimation.

The 832 operation state shown in FIG. 6 is described in FIGS. 1, 2, 3, 4, and 5. The 032 test condition, is the absolute position corresponds to the known 041 absolute position from a limit sensor, or from one or more sub-component of a compound position identification sensing apparatus, or relative position to a part or complete 210 calibration speckle feature within the 209 full speckle view as shown in FIG. 1 and FIG. 2. If the absolute position has not been identified, then sensing apparatus will continue to apply the 032 test condition to determine if the absolute position is known, as the 202 CMOS or CCD image sensor moves over the 208 surface of 200 part under observation.

After the 032 test condition determines the absolution is known and 202 CMOS or CCD image sensor is at a 210 calibration speckle image position, the next step is to check whether this is an incomplete 820 compound calibration image constructed of abutting 210 calibration speckle image positions. If the current 210 calibration speckle image position is an incomplete part of 820 compound calibration image constructed of abutting 210 calibration speckle image positions, then the known absolution position 032 test condition is updated with the found portion of the 820 compound calibration image.

FIG. 7 illustrates the varying speckle size which occurs while observing a round 200 part under observation. Light from the 120 laser is unfocused by the 130 optional source lens to cover the 110 speckle area. The average speckle $$d = 1.2 \frac{\lambda u}{D}$$

size is correspondingly larger when the u distance between the 202 CMOS or CCD image sensor and the 208 surface of 200 part under observation is larger. A 004 image uniform scaling correction step can be used to compensate for the non-uniform average speckle d size.

Figure 8:
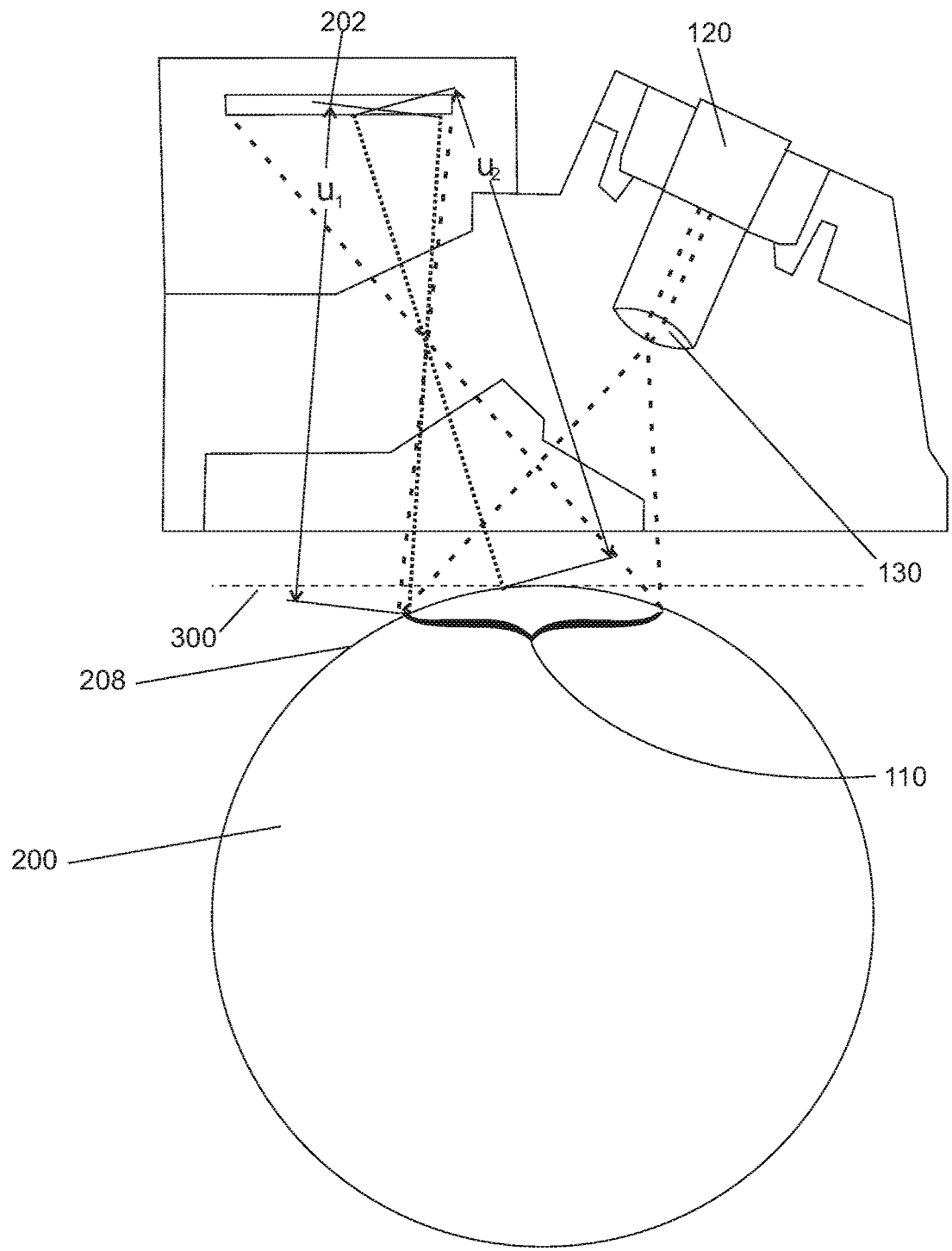
FIG. 8 is a cross section of a laser speckle pattern image sensing apparatus taken along cutting plain A-A of FIG. 24 illustrating the optical effects of round 200 part under observation.

FIG. 8 illustrates nonuniform speckle size resulting from a curved 208 surface of 200 part under observation. The $u_1$ distance between the 202 CMOS or CCD image sensor and the 110 laser speckle surface reflection is greater when the curved 208 surface of 200 part under observation is further away than the $u_2$ distance to the 300 flat part reference plain.

Figure 9:
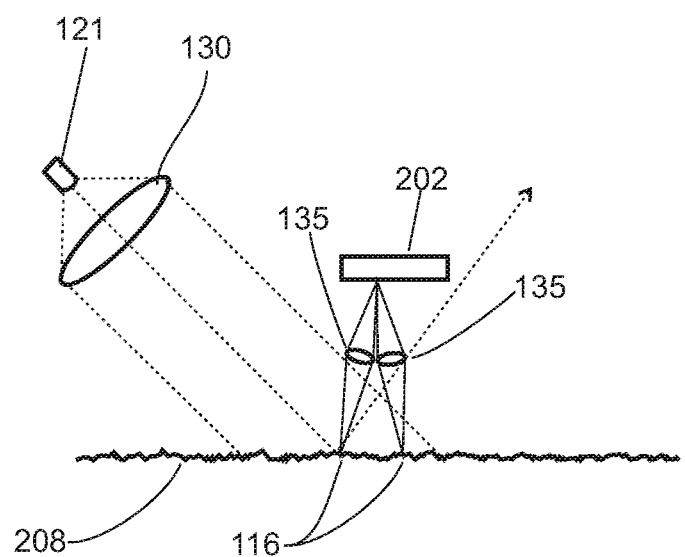
FIG. 9 is a diagram of spatially additive darkfield.

FIG. 9 is a diagram of spatially added darkfield. The objective is to select 210 calibration speckle images with a sufficiently high density of significant features to uniquely define a calibration position on the 208 surface of 200 part under observation. And the objective is not to measure the topology of the 208 surface of 200 part under observation. A 121 LED light source shines through a 130 optional source lens and illuminates the 208 surface of 200 part under observation. Each 135 collector lens or compound 135 collector lens collects darkfield scattered light from separate or overlapping 116 darkfield areas. Light pipes are able to provide the same function as multiple/compound 135 collector lens. In this implementation, multiple/compound 135 collector lens are preferred over light pipes due to their superior low distortion optical properties. The darkfield scattered light from multiple 116 darkfield areas is additively collected by the 202 CMOS or CCD image sensor. The magnifying power of the 135 collector lenses is chosen so that the facsimile speckle size is greater than 4 pixels×4 pixels. As illustrated in FIG. 8, a curved 208 surface of 200 part under observation reduces the reflected 110 speckle area. Multiple or compound 135 collector lens are ideally arranged along the length of the length of curved 200 part under observation.

Figure 11:
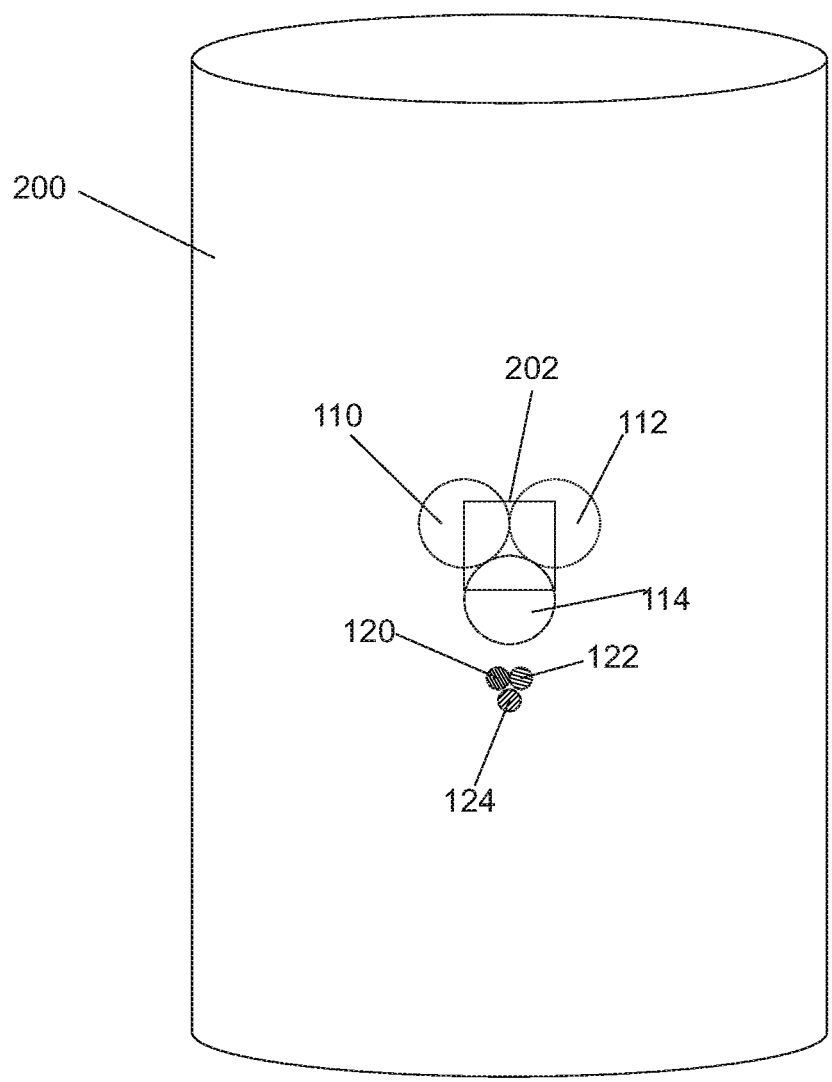
FIG. 11 is a diagram illustrating the top view of a compound speckle pattern image sensing apparatus with the 208 surface of the 200 part under observation below.

FIG. 10 and FIG. 11 illustrate multiple compound speckle pattern image sensing apparatus covering separated areas of the 208 surface of 200 part under observation. FIG. 10 illustrates the end view of multiple compound speckle pattern image sensing apparatus. FIG. 11 illustrates the top view of a compound speckle pattern image sensing apparatus with the 208 surface of the 200 part under observation below. Experimental observation has indicated events that damage the 208 surface of 200 part under observation cause localized damage. Multiple collectively unique 210 calibration speckle images are stored for each 210 calibration position, preventing loss of the 210 calibration position for most common damage events. When some 210 calibration speckle images are damaged, the calibration position is still recognizable providing that there are remaining 210 calibration speckle images which are locally unique. The relative position of the 210 calibration speckle images to other 210 calibration speckle image positions can uniquely resolve the 210 calibration speckle image position from other similar 210 calibration speckle image positions.

When the 209 full speckle view, shown in FIG. 16, 17, 18 is large enough, multiple collectively unique 210 calibration speckle images can be stored for each calibration position within the 209 full speckle view. Compound speckle pattern image sensing apparatus shown in FIG. 10 and FIG. 11 increases the 209 full speckle view area. However when the multiple collectively unique 210 calibration speckle images are in close proximity within a single 209 full speckle view area and 208 surface damaged in a local area could result in damage to multiple 210 calibration speckle images. 210 Calibration positions constructed of collectively unique 210 calibration speckle images from multiple speckle pattern image sensing apparatus are shown in FIG. 16, 17, 18. They are widely separated over the 208 surface of 200 part under observation. The widely separated 210 calibration speckle images are far less effected by events that damage the 208 surface of 200 part under observation. Damage is typically restricted to a sub-component of the multiple speckle pattern image sensing apparatus. The collectively unique 210 calibration speckle images enables instantaneous or rapid detection of changes to 210 calibration speckle images and reliably updating the 210 calibration speckle images.

Figure 12:
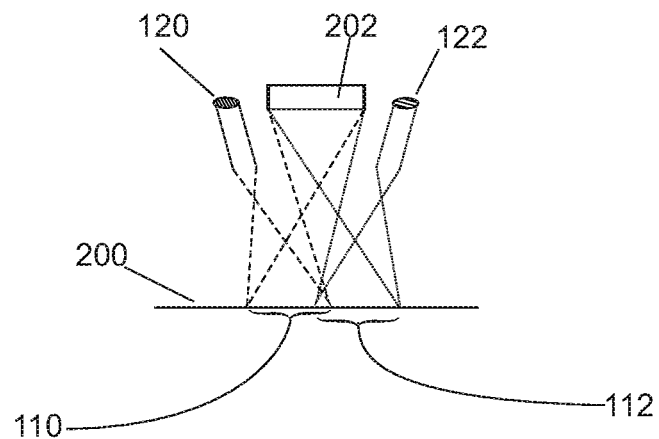
FIG. 12 is a diagram illustrating the end view of a compound speckle pattern image sensing apparatus with multiple laser LED taken along cutting plane B-B of FIG. 14.
Figure 13:
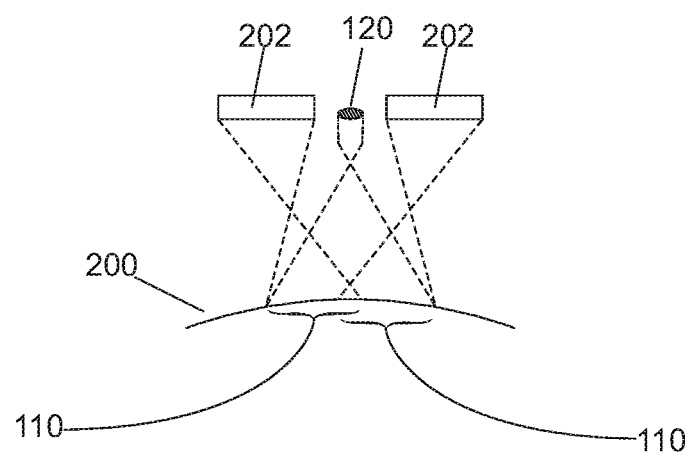
FIG. 13 is a diagram illustrating the end view of a compound speckle pattern image sensing apparatus with multiple speckle image collectors taken along cutting plane B-B of FIG. 14.

FIGS. 12 and 13 illustrate compound image sensing apparatus. The relative positions of the 202 CMOS or CCD image sensor and 120 Laser or 121 LED light sources are illustrative and are not an exact cross section of image sensing apparatus shown in FIG. 14. The single 202 CMOS or CCD image sensor illustrate in FIG. 12 is highly suitable for additive darkfield feature collection. 210 calibration positions require that the 208 surface of 200 part under observation is large enough to insure unique speckle patterns. The multiple 202 CMOS or CCD image sensors illustrated in FIG. 13 is suitable for laser speckle patterns or lateral orientation. Large 208 surface areas of 200 part under observation can be created by joining connected 208 surface areas by means of continuous observations as the laser speckle pattern image sensing apparatus passes over the 208 surface of 200 part under observation. This requires low error stitching of the observations together to form surface areas large enough to insure unique speckle patterns at calibration locations. As illustrated in FIG. 3, increasing the 202 CMOS or CCD image sensor size corresponding to a larger 208 surface of 200 part under observation significantly increases distortion caused by non-uniform average speckle size. However large 202 CMOS or CCD image sensors have high complexity and cost. The compound speckle pattern image sensor increases the 208 surface of 200 part under observation by using multiple 202 CMOS or CCD image sensors as shown in FIG. 10. The advantage is the smaller 208 surface of 200 part under observation corresponding to each 202 CMOS or CCD image sensor requires less 004 image uniform scaling. The compound laser speckle pattern image sensor such as illustrated in FIG. 11 can also increase the combined 208 surface of 200 part under observation by using a RGB 202 CMOS or CCD image sensors to combine the separate 110 laser speckle areas or 116 darkfield 208 surface areas.

Figure 14:
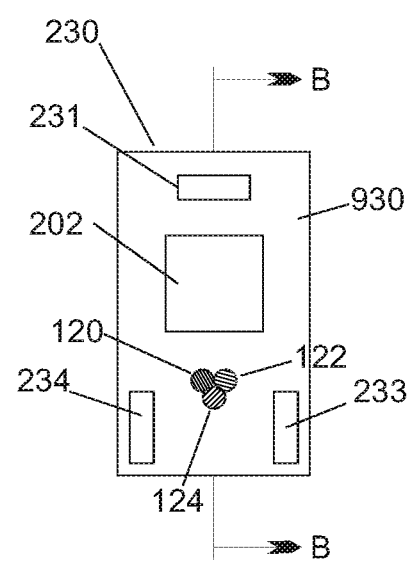
FIG. 14 is a diagram illustrating the bottom view of a compound speckle pattern image sensing apparatus.

FIG. 14 is the bottom view of a speckle pattern image sensing apparatus. The essential components of the compound of an image sensing apparatus are the 202 CMOS or CCD image sensor, one or more 120, 122, 124 laser or 121 led light sources, 230 sensor board, 231 microprocessor, FPGA and/or ASIC, 202 CMOS or CCD image sensor, 233 non-volatile memory and 234 volatile memory. Laser light sources produce laser speckle images. While led light sources would be typically used to produce darkfield images. The components 202 CMOS or CCD image sensor, one or more laser 120, 122, 124 coherent light source, 231 microprocessor, FPGA and/or ASIC, 233 non-volatile memory and 234 volatile memory are soldered to and electrically interconnected by the 230 sensor board. The 202 CMOS or CCD image sensor, one or more laser 120, 122, 124 coherent light source may be built as sub-module to facilitate easy correct placement of any 130 optical source lens used. The 231 microprocessor, FPGA and/or ASIC SOC, system on chip including 233 non-volatile memory and 234 volatile memory are required for execution of the control logic. A compound laser speckle pattern image sensing apparatus uses more than one 120 red laser, 122 blue laser, 124 green laser coherent light source and 202 CMOS or CCD image sensor with corresponding pixel red, blue, green colour. A simple non-compound laser speckle pattern image sensing apparatus uses only one 120 red laser, 122 blue laser or 124 green laser coherent light source and a black and white 202 CMOS or CCD image sensor.

Figure 15:
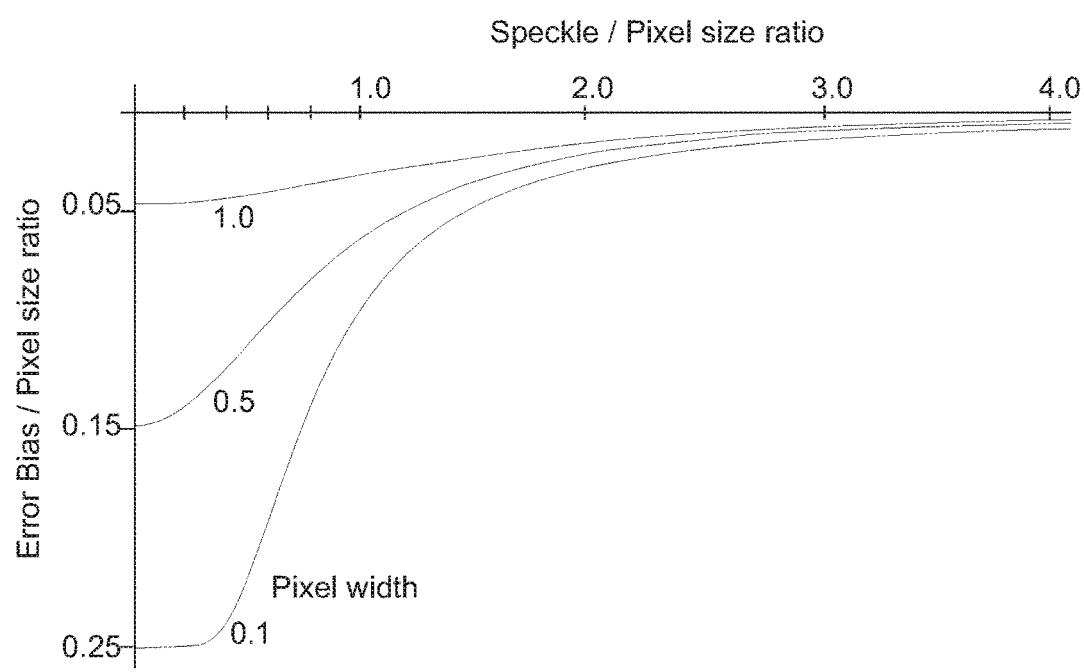
FIG. 15 is a graph of the position error bias vs the speckle/pixel size for multiple speckle features sizes.

FIG. 15 is a graph of the position error bias vs speckle/pixel size. The lines on the graph are the pixel width/feature width which is effectively pixel size/feature size for unity aspect ratios. The graph requires that the pixel array size is larger than the feature size. As result, feature size determines the minimum pixel array size. 210 Calibration positions large enough to ensure unique speckle patterns can be the combined 208 surface of all sub-components of the multiple compound laser speckle pattern image sensing apparatus such as shown in FIGS. 9, 10, 12, and 13.

The bias effect is shown to decrease as the speckle/pixel size increases and thus the Nyquist criteria is obeyed. When the speckle/pixel size is below 2 pixels×2 pixels, the Nyquist criteria, noise obstructs a precise determination of the speckle displacement. And the obstructed precise determination of the speckle displacement prevents 210 calibration positions with stable arrangements of significant points contrasting with adjacent surroundings. When pixel imaging errors and defects of 202 CMOS or CCD image sensor are taken into consideration, it is recommended that the speckle size is greater than 4 pixels×4 pixels along the horizontal and vertical axis of the 202 CMOS or CCD image sensor.

FIG. 17 illustrates a 210 calibration position natural speckle feature on the 208 surface of 200 part under observation. The entire 208 surface of 200 part under observation produces natural speckle patterns. For clarity, FIG. 17 only illustrates the natural speckle features at a 210 calibration position within a 209 full speckle view. The 210 calibration position natural speckle features are described by Gabor wavelets, SURF/SIFT feature descriptors and corresponding significant point speckle pattern. The complete speckle pattern is not stored, as result the reduced 234 volatile memory requirements can enable complete coverage of the 208 surface of 200 part under observation with 210 calibration positions.

Figure 19:
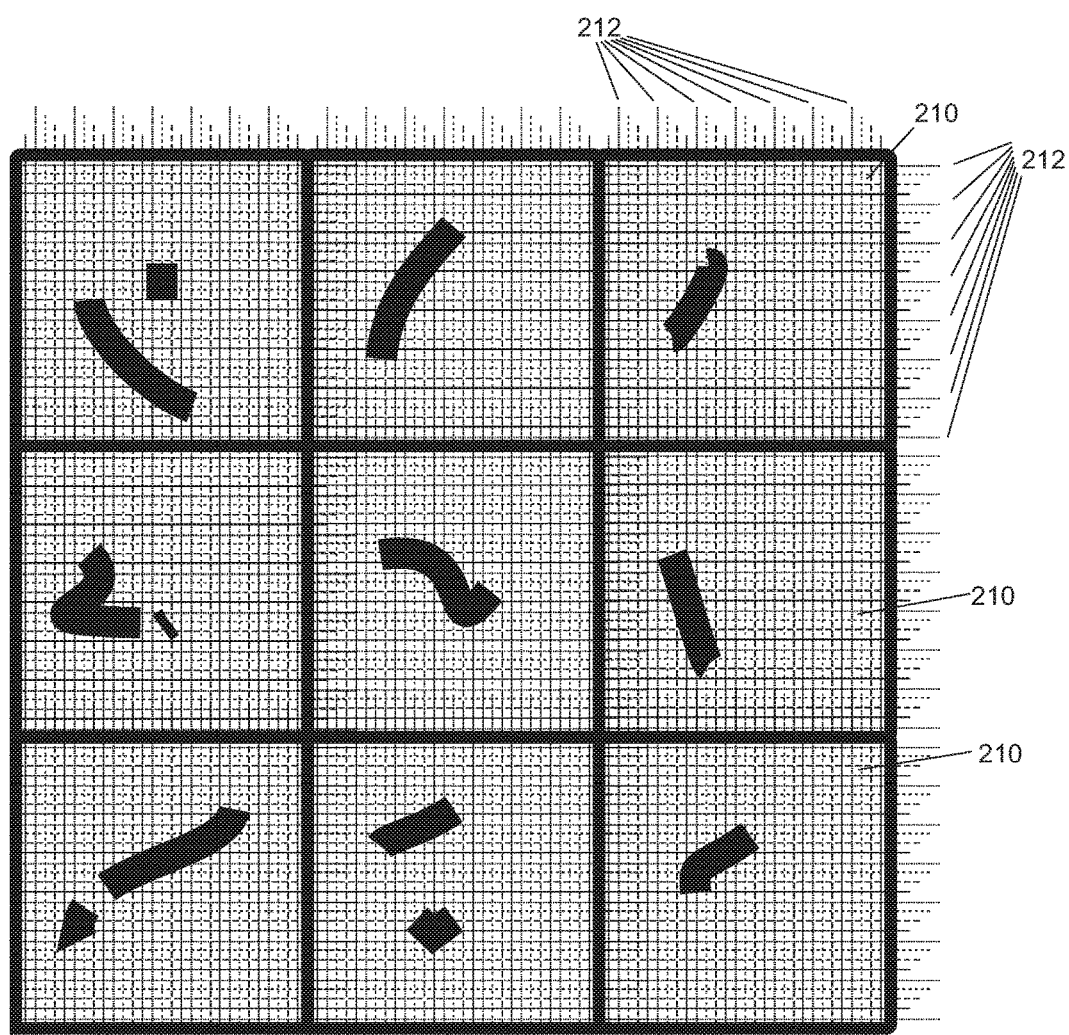
FIG. 19 illustrates abutting non-unique 210 calibration speckle images.

FIG. 19 illustrates abutting 210 calibration images positions. Each abutting 210 calibration image has few points of interest and has at least one SURF feature. After 804 initialization, the first detected 210 calibration image during 832 operation is unlikely to be uniquely mapped to an 041 absolute position. The matched 210 calibration image will assist the 009 position group selection of the 020 candidate matching SIFT/SURF feature descriptor. As the 832 operation continues, the relative position of additional matched 210 calibration images uniquely defines the absolute position. Once the 041 absolute position has been determined by the relative position of a collection of 210 calibration images, each subsequent detected 210 calibration image indicates the new absolute position by the relative position of the collection of 210 calibration images. No effort is taken to ensure that any 210 calibration position does uniquely define the absolute position. Every abutting 209 full speckle view contains at least one complete 210 calibration image. With no gaps between the simple 210 calibration image positions, there is no need to estimate the absolute position based on the relative displacement from the last known absolute position. The relative displacement from the previous 210 calibration images reconfirms the absolute position of the current 210 calibration image. The 210 calibration image only needs to be unique within the relative displacement error. Every abutting 209 full speckle view contains at lease one 210 calibration image, so that relative displacement error cannot accumulate between 210 calibration image positions. The 210 calibration image requires very few points of interest and very simple feature to be sufficiently unique. If the current 210 calibration image has been damaged, the current absolute position is known by calculating the precisely relative displacement from surrounding 210 calibration images. Using the current known absolute position a replacement 210 calibration image is selected and stored as previously described by FIG. 3.

Figure 20:
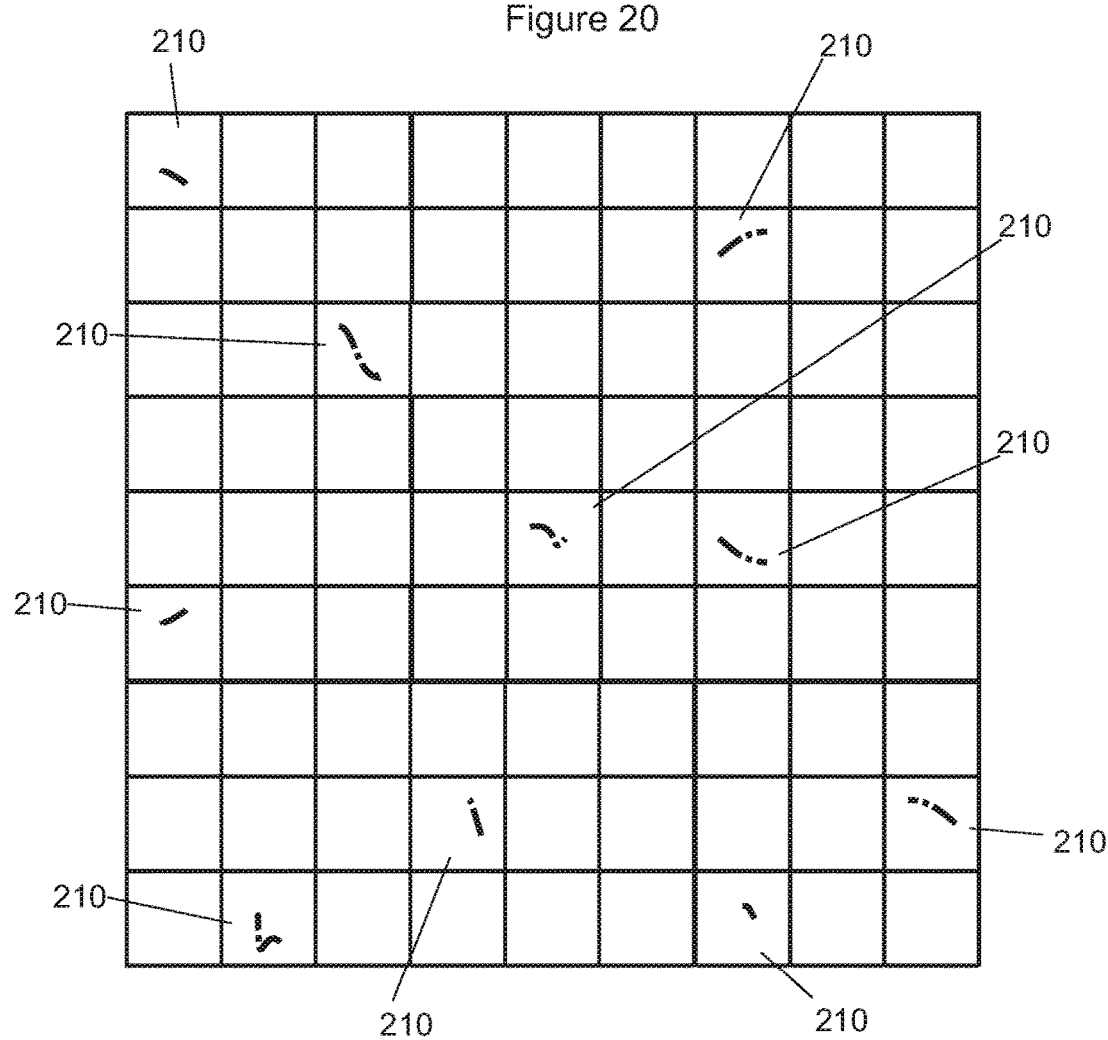
FIG. 20 illustrates non-unique 210 calibration speckle images spaced on 208 surface of the 200 part under observation.

FIG. 20 illustrates some randomly separated 210 calibration images positions surrounded by 210 calibration images separated by some distance. Each 210 calibration image has few points of interest and has at least one SURF feature. After 804 initialization, the absolute position is likely completely unknown until a 210 calibration image is matched. Even after a 210 calibration image is matched during 832 operation, it is unlikely to be uniquely mapped to an absolute position. The matched 210 calibration image and relative displacement between surrounding 210 calibration images will assist with the 009 position group selection of the 020 candidate matching SIFT/SURF feature descriptor. As the 832 operation continues, the relative position of additional matched 210 calibration images uniquely defines the absolute position. After the absolute position has been determined, the absolute position is estimated from relative displacement from the absolute positions of the surrounding 210 calibration images. When a 210 calibration image is damaged, it is not detected where expected. Each time a 210 calibration image is not detected near its 033 estimated absolute position, the 030 increment successful match count is not incremented. With insufficient reliable calibration image points, precise relative displacement from surrounding 210 calibration image positions is calculated until a replacement 210 calibration image is stored. When the most recent 210 calibration image position is different from the 210 calibration image position previously used, the new 033 estimated absolute position which is a less precise absolute position is used to statistically verify that the set absolute displacement of the new 210 calibration image position is correct. No effort is taken to ensure that any 210 calibration position uniquely defines the 041 absolute position.

Figure 21:
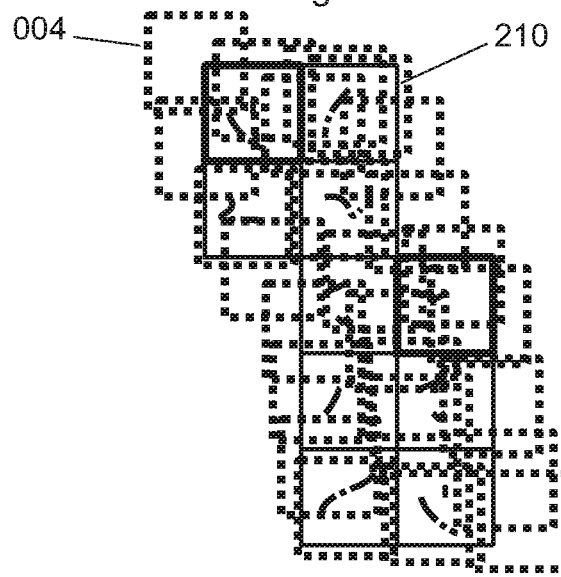
FIG. 21 illustrates 004 frame captures obtained during calibration mapping to 210 calibration speckle image frames.

The 041 absolute location of the 210 calibration positions is recorded during calibration mode. The process of mapping frame captured 001 speckle images to 210 calibration position frames is shown in FIG. 21. During calibration mode, the selection of 014 points of interest can be performed on all speckle images or the selection of 014 points of interest can be delayed until new speckle significant points are required for a 034 new SURF/SIFT descriptor for the known location. Once the 041 absolute position is known, the current capture frame can be used as a reference frame. On the first pass of the calibration mode operation, no 210 calibration positions have been recorded and the 925 time of flight sensor has not been calibrated. The known position of the 200 piston rod at full extension and full retraction is used as the initial known 041 absolute positions. These known 041 absolute positions are used to calibrate the 925 time of flight sensor and select a reference frame. In calibration mode, the 208 surface of 200 part under observation is mapped with frames abutting the selected reference frame. As the 230 optical displacement sensor moves over the 208 surface of 200 part under observation, 001 speckle images frames are captured. Many 001 speckle images frames may overlap with each abutting frame mapping the 208 surface of 200 part under observation. If sufficient memory is available, every abutting frame is used to store a 210 calibration image as shown in FIG. 19. When there are no gaps between the calibration positions, the 033 estimated absolute position is the absolute position of the 210 calibration positions. 212 Pixels can be periodically connected to form 001 speckle image comb filter groupings. The individual pixels or pixel groupings are connected to ADC analog digital converters that convert the pixel photo intensity into a binary representation used as the 001 speckle image. The 212 pixel periodically connected to form 001 speckle image comb filter groupings reduces the memory required to store the 210 calibration speckle image significant features and the computation effort required to match the 014 current speckle image significant features with stored 210 calibration speckle image significant features. Darkfield surface diffraction by its nature is concentrated to features and is not uniform over the surface. Many of the pixels of 212 periodically connected 001 speckle image comb filter groups will not simultaneously receive darkfield surface diffraction illumination. Alternate prior art 001 speckle image grouping implementation commonly used is grouping pixels to form 2×2 001 speckle image bins of neighbouring pixels. 2×2 or 4×4 001 speckle image bins of neighbouring pixels reduces the resolvable feature details.

A comb array can alternately be represented as a discrete Fourier transform (DFT). It can be concluded that a 1D comb array is essentially a 1D correlation at a special frequency. The 212 periodically connected 001 speckle image comb filter illustrates a 2D comb array with 4×4 elements per cell. Within each cell the 4×4 elements is illustrated by the lines; dotted, short dash, long dash, solid. The 212 periodically connected 001 speckle image comb filter of 4×4 cell elements is repeated. Each pixel element of the 4×4 cell is connected to the corresponding pixel element of adjacent cells. Alternative implementations may include 2D comb arrays having other than 4×4 pixel elements per cell, 2D comb arrays with sub-arrays or 2D comb arrays with dynamically reconfigurable comb connections to enable the spatial frequency to be dynamically changed.

The resolution of dynamically reconfigurable 2D comb arrays can be modified; by adjusting the resolution of the attached ADC, by reconfiguring the electrical connections of the pixels to the attached ADC, or by varying the combination of ADC binary pixel representations used as the 001 speckle image. The reconfigurable combination of ADC produced binary pixel representations used as the 001 speckle image is the preferred implementation. Equivalently the 001 speckle image can be reconfigurably combined in the 004 image uniform scale correction stage of the algorithm. 212 periodically connected 001 speckle image comb filter has the benefit of hardware enabled pixel correlation.

When there are gaps between the 210 calibration positions as shown in FIG. 20, the 033 estimated absolute position is obtained by measuring relative displacement from the previous 210 calibration position. Small errors in the measured relative displacement accumulate which result in error in the 033 estimated absolute position. The variance and mean is calculated of pixels within the 210 calibration frame from 001 speckle images frames overlapping with the 210 calibration frame. If the variance is uniformly too large, there is pixel misalignment error and the 440 IC-GN sub-pixel delta displacement algorithm is required or more iterations of the 440 IC-GN sub-pixel delta displacement algorithm are required. Points with high variance are not good candidates for 014 current speckle image significant features and should not be used for the 210 calibration image significant points. The 210 calibration speckle image selected significant points can be natural features or etching or laser blacken features.

There is no need for precise location control when etching the unique features. Good candidate features are 215 1D binary encoded calibration patterns shown in FIGS. 25 and 216 2D binary encoded calibration patterns shown in FIG. 26. The relative pattern geometry is enough to describe the 215 1D binary encoded calibration and 216 2D binary encoded calibration patterns as sequence, which greatly reduces the memory required to store either 215 1D binary encoded or 216 2D binary encoded calibration patterns. The precise location of each element of the binary encoded patterns is located using the method previously described for storing natural features as 210 calibration positions.

Figure 22:
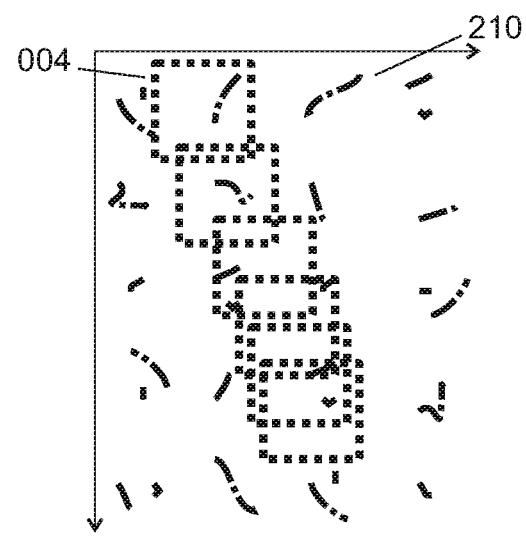
FIG. 22 illustrates mapping 210 calibration speckle images to 004 frame captures obtained during normal operation.

In FIG. 22, 210 calibration positions have been previously recorded in calibration mode described in FIG. 21. These 210 calibration position may have been natural features as shown in FIGS. 16, 17 and 18 or etched 215 1D/216 2D calibration positions. The 033 estimated absolute position is obtained by measuring relative displacement from the previous 210 calibration position and/or the 925 time of flight sensor. The ranging rate of the 925 time of flight sensor and its vulnerability to optical interference are key limitations of 925 time of flight sensors. Low cost 925 time of flight sensor is able to estimate the absolute position which dramatically reduces the time required to locate 210 calibration positions. The 033 estimated absolute position is used by the 009 position group selector as input to 012 SURF/SIFT descriptor selector of the candidate 210 calibration position. With knowledge of the 033 estimated absolute position, a few 014 significant feature points within the 001 speckle image capture frame are sufficient to detect the 210 calibration position and determinate the 041 absolute position.

Figure 23:
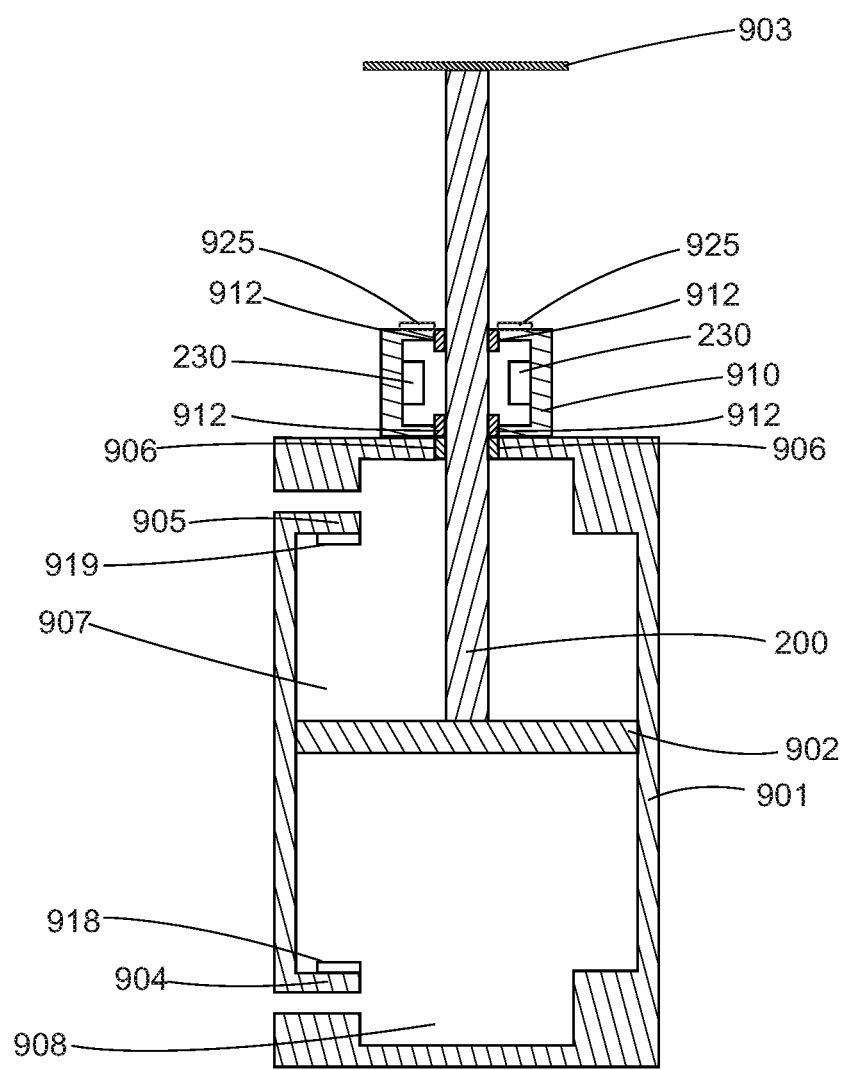
FIG. 23 is a cross section view of a hydraulic cylinder with an attached photo image sensor taken along cutting plane A-A of FIG. 24.

FIG. 23 shows a side cross-sectional view of an embodiment of a hydraulic cylinder assembly with a 230 optical displacement sensor assembly. The hydraulic cylinder assembly includes a 901 cylinder barrel and a 910 sensing apparatus housing. A 902 piston is arranged within the 901 cylinder barrel for reciprocating motion along an axis in response to hydraulic fluid. The 902 piston partitions the cylinder barrel 901 into two chambers, 907 and 908. The 910 housing is securely mounted on the 901 cylinder barrel.

One end of a 200 piston rod is fixed to the 902 piston and extends along the axis of the movement. The other end of the 200 piston rod extends out of the 910 housing. Either or both the cylinder base and outside end of the 200 piston rod maybe connected directly or indirectly with a machine component.

The 901 cylinder barrel has two openings for the passage of fluid such as oil or water into and out of the chambers 907, 908 for moving the 902 piston. 906 Seals within the 901 cylinder barrel are arranged to lie flush with the surface of the 200 piston rod and thus prevent fluid from leaving the 907 chamber.

The 910 housing encloses a 230 optical displacement sensor, which is used to determine the instantaneous position of the piston rod 200. The 912 seals within the 910 housing are arranged to clean the surface of the 200 piston rod and thus prevent fluid or dirt from contaminating the 230 optical displacement sensor. The 910 housing provides protection for the 230 optical displacement sensor assembly from the environment and permits easy replacement of the sensing unit. The 230 optical displacement sensor is mounted in the 910 housing within proximity of the piston rod's surface to permit reading of the movement of the 200 piston rod.

The 919 head contact pressure sensor is mounted at the 905 head stop of the 901 cylinder barrel. The 918 base contact pressure sensor is mounted at the 904 base stop of the cylinder barrel 901. Together these two contact sensors provide a two-bit digital signal to indicate whether the 902 piston reaches the 905 head stop or the 904 base stop, or neither. Correspondingly when the 902 piston reaches either the head 905 or base stop 904, the absolute displacement information in storage is adjusted and updated. The 925 time of flight sensors are mounted on the 910 housing and directed towards the 903 time of flight reflector attached to the 200 piston rod. The 925 time of flight sensors are calibrated at the 905 head stop and/or the 904 base stop. The 925 time of flight sensors estimate the 200 piston rod extension which is improved with the 230 optical displacement sensor.

In operation, fluid forced into or removed from the 907, 908 chambers at time-varying pressures causes the piston 902 and thus the 200 piston rod to slide back and forth relative to the 230 optical displacement sensor. The 230 optical displacement sensor reads the relative displacement of the 200 piston rod and produces a corresponding digital signal. The 231 microprocessor, FPGA and/or ASIC on the sensor board 930 calculates the absolute displacement of the 200 piston rod by matching the calibration pattern and using the relative displacement. The obtained absolute displacement indicates the actual position of the 200 piston rod and 902 piston.

Figure 24:
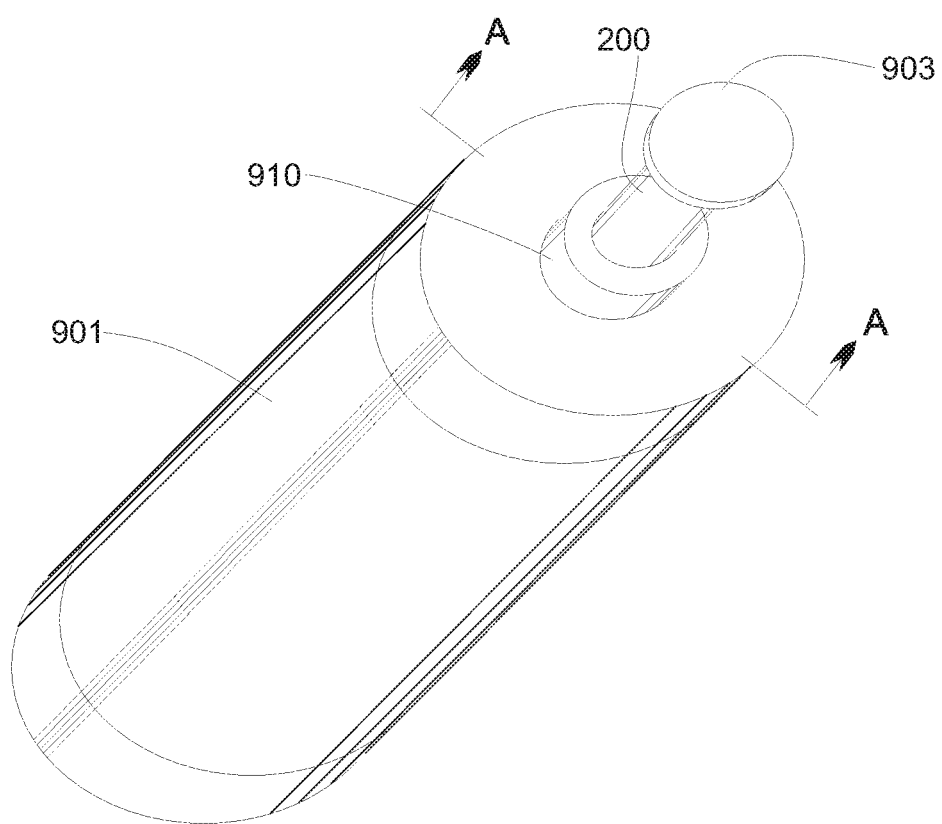
FIG. 24 is an isometric view of hydraulic cylinder with an attached photo image sensor.

FIG. 24 is an isometric view of hydraulic cylinder with an attached photo image sensor and shows the cutting line A-A used to obtain the cross section shown in FIG. 23.

Figure 25:
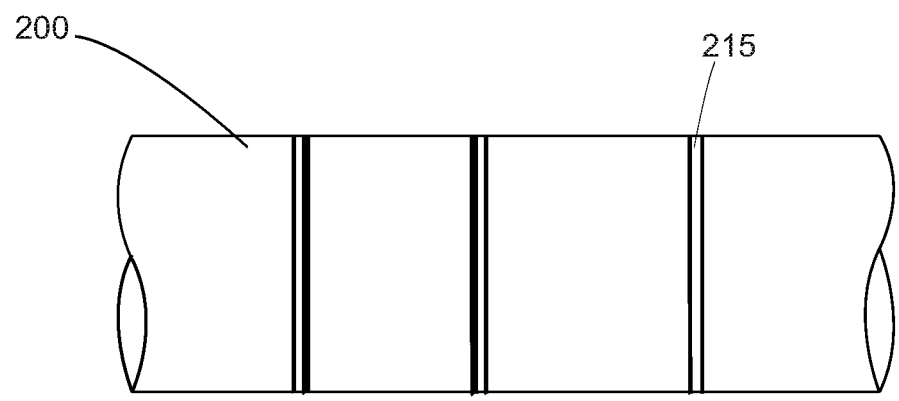
FIG. 25 is a side view of a 200 part under observation with 215 1D calibration patterns at three positions.

FIG. 25 is a diagrammatic view of 200 part under observation with 215 1D binary encoded calibration patterns. The number of calibration patterns is not confined to three. The number and placement of calibration patterns is determined by application requirements. Unique calibration patterns make it possible to determine which is the current calibration position based on its calibration pattern. The absolute location of the 215 1D binary encoded calibration patterns is determined during calibration mode, which enables the use of lower cost laser etching of the 215 1D binary encoded calibration patterns.

Figure 26:
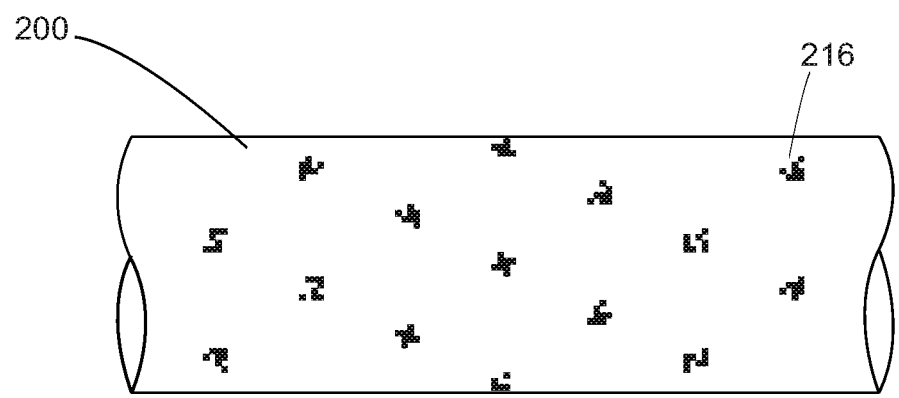
FIG. 26 is a side view of a 200 part under observation with spaced 216 2D calibration patterns.

FIG. 26 is a diagrammatic view of 200 part under observation with 216 2D binary encoded calibration patterns. The number and placement of calibration patterns is determined by application requirements. Unique calibration patterns make it possible to determine which is the current calibration position based on its calibration pattern. The absolute location of the 216 2D binary encoded calibration patterns is determined during calibration mode, which enables the use of lower cost laser etching of the 216 2D binary encoded calibration patterns. The reduced etching needed for the widely spaced 216 2D binary encoded calibration patterns is able to further reduce manufacturing costs.

What is claimed is:

1. An optical apparatus for measuring absolute mechanical displacement of actuators, joints, or other mechanical apparatus that contain mechanical parts that move with respect to each other, comprising:
   a) an (230) image sensor capturing (001) images directed at the (208) surface of a (200) moving part of said mechanical apparatus under observation that moves with respect to said (230) image sensor capturing (001) images, such that said (230) image sensor capturing (001) images is mounted onto another part of said mechanical apparatus,
   b) (014) points that contrast with adjacent surroundings from said (001) images,
   c) a plurality of (210) calibration positions, such that at each said (210) calibration position, there is an arrangement of known calibration points that contrast with adjacent surroundings on said (208) surface, and
   d) detected (026) alignment of said (200) moving part with said (230) image sensor capturing (001) images at said (210) calibration position by matching said (014) points that contrast with adjacent surroundings with said known calibration points that contrast with adjacent surroundings, such that the absolute displacement of said (200) moving part with respect to said (230) image sensor capturing (001) images is known absolute displacement,
   whereby said absolute displacement of said (200) moving part with respect to said (230) image sensor capturing (001) images is corrected at said (210) calibration positions, and whereby said (210) calibration positions do not require markings on said (208) surface of said (200) moving part of said mechanical apparatus under observation.

2. The optical apparatus of claim 1, further including:
   a) measured relative displacement of said (200) moving part from the previous position of said (200) moving part with respect to said (230) image sensor capturing (001) images, and
   b) estimated absolute displacement obtained by cumulative said measured relative displacement from said known absolute displacement of said (210) calibration positions,
   whereby said estimated absolute displacement is estimated between said known absolute displacement of said (210) calibration positions,
   whereby said estimated absolute displacement accuracy decreases with increasing number of said measured relative displacements from said known absolute displacement of said (210) calibration positions, and
   whereby said mechanical apparatus cost is reduced through the reduced number of required said (210) calibration positions.

3. The optical apparatus of claim 2, further including:
   a) obtained absolute displacement by accumulation of enhanced accuracy said measured relative displacements from said known absolute displacement of said (210) calibration positions,
   b) identified said (210) calibration positions where said detected (026) alignment is detected near said known absolute displacement of said (210) calibration positions and said obtained absolute displacement of said (200) moving part does not match said known absolute displacement of said (210) calibration position, such that said known absolute displacement of said identified (210) calibration positions can be updated, and
   c) identified said (210) calibration positions where said detected (026) alignment is not detected near said obtained absolute displacement of said (210) calibration positions, such that said identified (210) calibration positions can be deleted,
   whereby said obtained absolute displacement is able to verify said known absolute displacement of said (210) calibration positions,
   whereby said obtained absolute displacement is able to improve the accuracy of said known absolute displacement of said (210) calibration positions,
   whereby said obtained absolute displacement is able to identify and delete said (210) calibration positions which are no longer detectable within proximity of their original said known absolute displacement, and
   whereby said optical apparatus is able to release memory used by said (210) calibration positions which are no longer detectable within proximity of their original said known absolute displacement.

4. The optical apparatus of claim 2, further including:
a) estimated absolute displacement accuracy determined by the number of said measured relative displacements from last said known absolute displacement of said (210) calibration position,
b) detected absence of sufficient said (210) calibration positions by insufficient said estimated absolute displacement accuracy,
c) obtained said absolute displacement of said (200) moving part with respect to said (230) image sensor capturing (001) images, and
d) storage of said (210) calibration positions, such that at each said (210) calibration position, said absolute displacement of said (200) moving part with respect to said (230) image sensor capturing (001) images is known and such that at each said (210) calibration position, said calibration points that contrast with adjacent surroundings are known,
whereby more said (210) calibration positions are stored to increase the accuracy of said estimated absolute displacement by reducing said number of said measured relative displacements from last said known absolute displacement of said (210) calibration position.

5. The optical apparatus of claim 2, wherein said known calibration points that contrast with adjacent surroundings selected to be a locally unique (018) feature, such that said locally unique (018) feature is unique within the estimation error of said estimated absolute displacement,
whereby selected said locally unique (018) features can be very simple and only need to be unique within the relatively small area defined by said estimation error of said estimated absolute displacement, and
whereby said locally unique (018) features are simple requiring less (233) non-volatile memory, thus enabling more said locally unique (018) features to be stored.

6. The optical apparatus of claim 1, wherein said known calibration points that contrast with adjacent surroundings are selected to be a globally unique (018) feature, such that said globally unique (018) feature is unique among all said known calibration points,
whereby each said (210) calibration position is identifiable by its globally unique said arrangements of (014) points stored at said (210) calibration positions.

7. The optical apparatus of claim 1, wherein said (210) calibration positions are adjacent, such that said absolute displacement is obtained from one or more said (210) calibration positions, whereby said absolute displacement error does not occur between said (210) calibration positions.

8. The optical apparatus of claim 1, wherein said arrangement of known calibration points of said (210) calibration positions are locally unique (018) features, such that relative displacement between said (210) calibration positions uniquely defines said (210) calibration positions, whereby said relative displacement between said (210) calibration positions provides detection and correction of errors in said (210) calibration positions' said absolute displacements, and whereby said locally unique (018) features used as said arrangement of known calibration points are less complex, requiring less (233) non-volatile memory, thus enabling more said locally unique (018) features to be stored.

9. The optical apparatus of claim 1, wherein said (210) calibration positions, are marks created on said (208) surface of said (200) moving part, such that said (210) calibration positions are encoded sequences, such that said (210) calibration positions with one dimensional encoded sequences have their said known absolute displacement defined by one dimension, such that said (210) calibration positions with two dimensional encoded sequences have their said known absolute displacement defined by two dimensions,
whereby creating marks on said (208) surface of said (200) moving part ensures that said (210) calibration positions with said known calibration points that contrast with adjacent surroundings are said encoded sequence requiring significantly less (233) non-volatile memory,
whereby creating marks on said (208) surface of said (200) moving part ensures that said (210) calibration positions with said known calibration points are located sufficiently closely spaced to ensure an acceptable measurement error, and
whereby creating marks on said (208) surface of said (200) moving part ensures that said (210) calibration positions with said known calibration points can be sparsely located to minimize manufacturing costs.

10. The optical apparatus of claim 1, wherein said (210) calibration positions, are selected natural calibration points that contrast with adjacent surroundings,
whereby a manufacturing process of creating marks on said (208) surface of said (200) moving part is not required, which reduces manufacturing cost.

11. The optical apparatus of claim 1, wherein said detected (026) alignment of said (200) moving part further includes:
a) one or more (903) optical distance reflectors moving together with said (200) moving part of said mechanical apparatus under observation, and
b) one or more (925) optical distance sensors moving together with said (230) image sensor capturing (001) images, such that said one or more (925) optical distance sensors measure the distance to said one or more (903) optical distance reflectors,
whereby said (925) optical distance sensors reduces the number of candidate said (210) calibration positions to be searched for a match, and
whereby said (925) optical distance sensors assist said detected (026) alignment of said (014) points with said known calibration points and reduces computational cost.

12. An optical method of measuring absolute mechanical displacement of actuators, joints, or other mechanical apparatus that contain mechanical parts that move with respect to each other, comprising the steps of:
a) measuring relative displacement of a (200) moving part of said mechanical apparatus by (230) image sensor capturing (001) images of said (200) moving part which is moving with respect to said (230) image sensor capturing (001) images, such that said (230) image sensor capturing (001) images is mounted onto another part of said mechanical apparatus,
b) obtaining known absolute displacement of said (200) moving part at (210) calibration positions, and
c) estimating absolute displacement of said (200) moving part by means of the cumulative said measured relative displacement from said obtained known absolute displacement of said (210) calibration positions,
whereby said absolute displacement of said (200) moving part that moves with respect to said (230) image sensor capturing (001) images is corrected at (210) calibration positions.

13. The optical method of claim 12, wherein the method of said obtaining known absolute displacement of said (200) moving part, comprises the steps of:
  a) capturing (001) images of the (208) surface of said (200) moving part by said (230) image sensor,
  b) selecting arrangements of (014) points from said (001) captured images that contrast with adjacent surroundings,
  c) storing said selected arrangements of (014) points at said (210) calibration positions, and
  d) (026) detecting alignment with said (210) calibration positions by matching said selected arrangements of (014) points with said arrangements of (014) points stored at said (210) calibration positions, such that when said (026) detected alignment occurs, said absolute displacement of said (200) moving part is said obtained known absolute displacement of said (210) calibration position,
  whereby said estimated absolute displacement of said (200) moving part is corrected at said (210) calibration positions with said stored selected arrangements, and
  whereby applied markings are not required on said (208) surface of said (200) moving part of said mechanical apparatus under observation.

14. The optical method of claim 13, further including the steps of:
  a) detecting an absence of sufficient locations of said (210) calibration positions with said stored selected arrangements of (014) points for sufficient accuracy of said estimating absolute displacement,
  b) obtaining said absolute displacement of said (200) moving part by an alternate means, and
  c) storing said selected arrangements of (014) points at locations of said (210) calibration positions by said alternate means of obtaining said absolute displacement, such that locations of said (210) calibration positions with said stored selected arrangements are added and said estimated absolute displacement is improved accordingly,
  whereby said storing selected arrangements of (014) points at locations of said obtained absolute displacements to create new said (210) calibration positions with said stored selected arrangements continues until they are sufficient for desired alignment accuracy of said (230) image sensor capturing said (001) images over said (208) surface of said (200) moving part, and
  whereby new said (210) calibration positions with said stored selected arrangements are added, replacing any lost or obscured said (210) calibration positions with said stored selected arrangements of (014) points.

15. The optical method of claim 14, wherein the method of said obtaining absolute displacement of said (200) moving part by said alternate means is another optical method of measuring absolute mechanical displacement of actuators, joints, or other mechanical apparatus that contain mechanical parts that move with respect to each other,
  whereby multiple optical methods of measuring absolute mechanical displacement of actuators, joints, or other mechanical apparatus are able to provide said alternate means of obtaining said absolute displacement.

16. The optical method of claim 13, wherein the method of said capturing (001) images combines said (001) images to form combined (001) image (212) groups, such that when said (001) images are combined to form (212) groups, the complexity of said selecting arrangements of (014) points is reduced,
  whereby said reduced complexity of said selecting arrangements of (014) points enables faster selection of (014) points, which enables faster movement of said mechanical parts that move with respect to each other.

17. The optical method of claim 13, wherein the method of said capturing (001) images combines sequences of equally separated said (001) images to form combined (001) image (212) groups, such that when said (001) images are combined to form (212) groups, the complexity of said selecting arrangements of (014) points is reduced,
  whereby said reduced complexity of said selecting arrangements of (014) points enables faster selection of (014) points, which enables faster movement of said mechanical parts that move with respect to each other.

18. The optical method of claim 13, further including the steps of:
  a) estimating said absolute displacement by means of one or more (925) optical distance sensors, and
  b) selecting said (210) calibration positions with said arrangements of (014) points at said known absolute displacements in the locality of said estimated absolute displacement,
  whereby the number of said (210) calibration positions that need examination to find a match is greatly reduced by said (925) optical distance sensors, and
  whereby the computational effort required by said means of (026) detecting alignment of said selected arrangements of (014) points at said (210) calibration positions with said stored selected arrangements is reduced.

19. The optical method of claim 13, further including the steps of:
  a) measuring said absolute displacement of said (200) moving part with respect to said (230) image sensor capturing (001) images, such that when said (026) detected alignment occurs between said selected arrangements of (014) points from said (001) captured images and said arrangements of (014) points stored at said (210) calibration positions, said measuring absolute displacement of said (200) moving part is compared with said known absolute displacement of said (210) calibration position,
  b) identifying said (210) calibration positions where said measuring absolute displacement of said (200) moving part is in proximity with said known absolute displacement of said (210) calibration position, such that said known absolute displacement of said identified (210) calibration position can be updated with said measuring absolute displacement of said (200) moving part, and
  c) identifying said (210) calibration positions where said measuring absolute displacement of said (200) moving part is not in proximity with said known absolute displacement of said (210) calibration position, such that said identified (210) calibration position can be deleted,
  whereby said measured absolute displacement is used to verify said obtained known absolute displacement of said (210) calibration positions,
  whereby said measured absolute displacement can be used to improve the accuracy of said known absolute displacement of said (210) calibration positions,
  whereby said measured absolute displacement can be used to identify and delete said (210) calibration positions that are no longer detectable within proximity of their original location, and
  whereby memory used by said (210) calibration positions that are deleted can be released.

20. The optical method of claim 13, further including the step of selecting said arrangements of (014) points that are globally unique, such that each globally unique said arrangement of (014) points is unique among all said arrangements of (014) points stored at said (210) calibration positions, whereby each said (210) calibration position is identifiable by its globally unique said arrangements of (014) points stored at said (210) calibration positions.

21. The optical method of claim 13, further including the step of selecting said arrangement of (014) points that are locally unique, such that each locally unique said arrangement of (014) points is unique within the estimating error of said estimated absolute displacement, whereby each said selected locally unique said arrangement of (014) points can be very simple and only needs to be unique within the relatively small area defined by said estimating error of said estimated absolute displacement, and whereby each said selected locally unique said arrangement of (014) points is simple requiring less (233) non-volatile memory, thus enabling more locally unique said arrangements of (014) points to be stored.

22. The optical method of claim 13, wherein said (230) image sensor capturing (001) images comprises steps of:
a) capturing a plurality of said (001) images from multiple areas of said (208) surface of said (200) moving part, and
b) combining said plurality of said (001) images to create a (820) compound image combining optical features from said plurality of said captured (001) images, whereby said (820) compound image combining optical features from said plurality of said captured (001) images has an increased probability of containing unique optical features and as result multiple said (820) compound images are not required to uniquely define said (210) calibration positions.

23. The optical method of claim 13, wherein said steps of:
a) said selecting arrangements of (014) points involves selecting naturally occurring said (014) points that contrast with adjacent naturally occurring surroundings from said (001) images, and
b) said selecting arrangements of (014) points stored at said (210) calibration positions involves selecting naturally occurring said (014) points that contrast with adjacent naturally occurring surroundings, whereby a manufacturing process for creating marks on said (208) surface of said (200) moving part is not required, which reduces manufacturing cost.

24. The optical method of claim 12, wherein said (230) image sensor capturing (001) images consists of one or more (925) optical distance sensors, and wherein the method of said obtaining known absolute displacement of said (200) moving part, comprising the steps of:
a) calibrating one or more said (925) optical distance sensors at said (210) calibration positions, and
b) measuring said absolute displacement by means of one or more said (925) optical distance sensors, whereby said (925) optical distance sensor measurement of said absolute displacement is verified and said (925) optical distance sensor systematic measurement errors are correctable by calibration.

25. The optical method of claim 12, wherein said (210) calibration positions are adjacent or overlapping, such that said measured relative displacement does not accumulate while moving between said (210) calibration positions, whereby errors in said measured relative displacement do not accumulate in said estimated absolute displacement.

26. The optical method of claim 12, further including a step of creating marks on said (208) surface of said (200) moving part at said known absolute displacements of said (210) calibration positions, such that series of said created marks form encoded sequences, whereby creating marks on said (208) surface of said (200) moving part allows said (210) calibration positions with said encoded sequences to require significantly less (233) non-volatile memory, whereby creating marks on said (208) surface of said (200) moving part allows said (210) calibration positions to be located sufficiently close to each other to provide an acceptable estimated absolute displacement error, and whereby creating marks on said (208) surface of said (200) moving part allows said (210) calibration positions to be sparsely located to minimize manufacturing costs.

* * * * *